(12) United States Patent
Seo et al.

(10) Patent No.: US 12,506,574 B2
(45) Date of Patent: Dec. 23, 2025

(54) METHOD AND APPARATUS FOR MULTI-PILOT OPERATION FOR NON-LINEARITY COMPENSATION OF AMPLIFIER

(71) Applicant: SAMSUNG ELECTRONICS CO., LTD., Suwon-si (KR)

(72) Inventors: Bongsung Seo, Suwon-si (KR); Suhwook Kim, Suwon-si (KR); Seungil Park, Suwon-si (KR); Byeonghun Hwang, Suwon-si (KR); Hyeondeok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 18/157,679

(22) Filed: Jan. 20, 2023

(65) Prior Publication Data

US 2024/0214141 A1    Jun. 27, 2024

(30) Foreign Application Priority Data

Dec. 21, 2022    (KR) ........................ 10-2022-0180279

(51) Int. Cl.
*H04L 5/00*    (2006.01)
*H04L 25/02*    (2006.01)

(52) U.S. Cl.
CPC ........ *H04L 5/0048* (2013.01); *H04L 25/0202* (2013.01)

(58) Field of Classification Search
CPC ............ H04L 25/0202; H04L 25/0224; H04L 5/0048
See application file for complete search history.

(56) References Cited

U.S. PATENT DOCUMENTS

| | | |
|---|---|---|
| 7,619,468 B1 | 11/2009 | Bowles et al. |
| 2004/0179629 A1 | 9/2004 | Song et al. |
| 2013/0259161 A1 | 10/2013 | Lim |
| 2018/0034607 A1 | 2/2018 | Kim et al. |
| 2019/0363742 A1 | 11/2019 | Megretski et al. |
| 2021/0266875 A1 | 8/2021 | Namgoong et al. |

(Continued)

FOREIGN PATENT DOCUMENTS

| | | |
|---|---|---|
| KR | 10-2012-0054523 A | 5/2012 |
| KR | 101349626 B1 | 1/2014 |

(Continued)

OTHER PUBLICATIONS

International Search Report and Written Opinion of the International Searching Authority dated Aug. 29, 2023, in connection with International Application No. PCT/KR2022/020969, 18 pages.

*Primary Examiner* — Mansour Oveissi

(57) ABSTRACT

The disclosure relates to a 6G communication system for achieving high data transmission rates and ultra-low latency after 4G and 5G communication systems. A method performed by a base station in a communication system according to an embodiment of the disclosure may include identifying a first pilot for channel estimation or a second pilot for non-linearity compensation of a PA, identifying pilot information related to at least one of the first pilot and the second pilot, and transmitting, to a terminal, control information including the pilot information.

20 Claims, 14 Drawing Sheets

(56) References Cited

U.S. PATENT DOCUMENTS

2022/0038229 A1\* 2/2022 Levy .................. H04L 5/0048
2022/0321298 A1 10/2022 Levy et al.

FOREIGN PATENT DOCUMENTS

| KR | 101503548 B1 | 3/2015 |
|----|--------------|--------|
| KR | 20150095250 A | 8/2015 |
| KR | 20220145827 A | 10/2022 |
| WO | 2008154077 A1 | 12/2008 |

\* cited by examiner

METHOD AND APPARATUS FOR MULTI-PILOT OPERATION FOR NON-LINEARITY COMPENSATION OF AMPLIFIER

CROSS-REFERENCE TO RELATED APPLICATION

This application is based on and claims priority under 35 U.S.C. § 119 to Korean Patent Application No. 10-2022-0180279, filed on Dec. 21, 2022, in the Korean Intellectual Property Office, the disclosure of which is herein incorporated by reference in its entirety.

BACKGROUND

1. Field

The disclosure relates to a method and an apparatus for transmitting and receiving a signal by a wireless communication base station or a terminal. More specifically, the disclosure relates to a method and an apparatus in which, when a transmission node transmits a signal by increasing transmission power through a power amplifier (PA), a reception node receives data through compensation of the non-linearity of the PA.

2. Description of Related Art

To meet the demand for wireless data traffic having increased since deployment of 4th generation (4G) communication systems, efforts have been made to develop a 5th generation (5G) or pre-5G communication system. Therefore, the 5G or pre-5G communication system is also called a "beyond 4G Network" communication system or a "post long term evolution (post LTE)" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Since a 5G communication system may freely reflect various requirements of users, service providers, and the like, services satisfying various requirements may be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB may provide a peak data rate of 20 Gbps in the downlink and a peak data rate of 10 Gbps in the uplink for a single base station. Furthermore, the 5G communication system may provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IOT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, the Internet of Things may support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC may be configured to be inexpensive, and requires a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC may provide communication with ultra-low latency and ultra-high reliability. For example, a service supporting URLLC may satisfy an air interface latency of less than 0.5 ms, and also requires a packet error rate of 10-5 or less. Therefore, for the services supporting URLLC, a 5G system may provide a transmit time interval (TTI) shorter than those of other services, and also requires a design for assigning a large number of resources in a frequency band in order to secure reliability of a communication link.

A review of the development of wireless communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various form factors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

In order to satisfy these various services, a wide bandwidth is required. Accordingly, research on a high bandwidth that has not been used before is being conducted, and mmWave and THz research are being conducted in 5G and beyond-6G communication systems. However, in the ultra-high frequency band, the propagation path loss of radio waves is serious, resulting in narrow coverage. Due to this issue, in the case of base stations with narrow coverage, too many base stations are required to be installed, resulting in large capital expenditures (CAPEX).

Various technologies have been provided to solve the aforementioned coverage issue. Among these technologies, a method for performing transmission with a higher-output power using a power amplifier (PA) is provided. However, since non-linearity in which the phase and amplitude of a transmission signal are distorted occurs in the high-output power region of the PA, the use of PA with high-output power may be limited. Accordingly, a back-off process of limiting the operating range of the PA to an output power lower than the maximum output power of the PA may be performed to prevent operation in a nonlinear region. When the back-off process is applied, a probability in which an input signal of the PA is included in the nonlinear region is lowered, so as to prevent data reception performance deterioration due to the nonlinearity. However, the transmission power is relatively lowered, resulting in coverage loss.

In order to solve this problem, peak-to-average power ratio (PAPR) reduction technology, digital pre-distortion (DPD) technology, and non-linearity compensation (NC) technology are being considered. In addition, research on a method for solving the nonlinearity using artificial intelligence (AI) is also being conducted.

AI may be divided into (i) supervised learning in which a ground-truth value is basically given, and a model is trained by learning the ground-truth value as the labeling value of training data, (ii) unsupervised learning that extracts relationships and characteristics between data without a ground truth value, and (iii) reinforcement learning in which AI is trained through a compensation system. Although the supervised learning among them may have a difficulty in collecting labeled data, the supervised learning may train AI with good performance.

There are two types of AI: (i) an offline-training method for loading a well-trained model from the beginning, and (ii) an online-training method for continuously updating a model to reflect the ever-changing environment. In the offline-training method, when a model does not need to be changed, additional training is not necessary after training the model once with a large dataset. That is, the model may be pre-trained during a chip design process, and the trained AI model may be loaded into a chip algorithm. However, in case that the environment continuously changes, a fixed model may have a difficulty reflecting the changing environment, and thus online-training in which the model is continuously updated is necessary.

The Internet, which is a human centered connectivity network where humans generate and consume information, is now evolving to the Internet of things (IOT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology and various industrial applications.

The above information is presented as background information only to assist with an understanding of the disclosure. No determination has been made, and no assertion is made, as to whether any of the above might be applicable as prior art with regard to the disclosure.

SUMMARY

As described above, various services may be provided according to the development of a mobile communication system, and thus a scheme of compensating for the nonlinearity of a PA in a reception node may be considered as a scheme for improving data reception performance and increasing coverage. When a transmission node transmits a signal by increasing transmission power through the PA in order to improve coverage, a reception node may receive data by compensating for the nonlinearity of the PA in order to improve data reception performance.

Meanwhile, in order for the reception node to have excellent performance of compensation of the nonlinearity of a PA, accurate channel information and accurate non-linearity information are required.

Accordingly, it is necessary to devise operations of a transmission node and a reception node considering a pilot of usage for accurate channel information acquisition and a pilot of usage for accurate non-linearity information acquisition.

A method performed by a base station in a communication system according to an embodiment of the disclosure may include identifying a first pilot for channel estimation or a second pilot for non-linearity compensation of a PA, identifying pilot information related to at least one of the first pilot and the second pilot, and transmitting, to a terminal, control information including the pilot information.

A method performed by a terminal in a communication system according to an embodiment of the disclosure may include receiving, from the base station, control information including pilot information, and identifying, based on the pilot information, a first pilot for channel estimation or a second pilot for non-linearity compensation of a PA.

A base station in a communication system according to an embodiment of the disclosure may include a transceiver, and a controller configured to identify a first pilot for channel estimation or a second pilot for non-linearity compensation of a PA, identify pilot information related to at least one of the first pilot and the second pilot, and transmit, to a terminal, control information including the pilot information.

A terminal in a communication system according to an embodiment of the disclosure may include a transceiver, and a controller configured to receive, from the base station, control information including pilot information, and identify, based on the pilot information, a first pilot for channel estimation or a second pilot for non-linearity compensation of a PA.

According to the disclosure, by performing multi-pilot operation for each usage, such as a pilot for channel information acquisition and a pilot for non-linearity information acquisition, a reception node can obtain accurate channel information and non-linearity information. Accordingly, PA non-linearity compensation performance of the reception node can be improved.

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to more clearly describe the technical solutions of the embodiments provided in the disclosure, drawings of the embodiments will be briefly introduced. The following drawings are only for reference for the embodiments of the disclosure, and are not used to limit the disclosure:

FIG. 14 illustrates an example of a signal reception path on a receiver side during multi-pilot operation for each usage according to an embodiment of the present disclosure;

FIG. 15 illustrates an example of AI-based non-linearity compensation performance according to whether multi-pilot operation is performed according to an embodiment of the present disclosure;

FIG. 16 illustrates an example of a terminal according to an embodiment of the present disclosure; and FIG. 17 illustrates an example of a base station according to an embodiment of the present disclosure.

DETAILED DESCRIPTION

Figure 1:
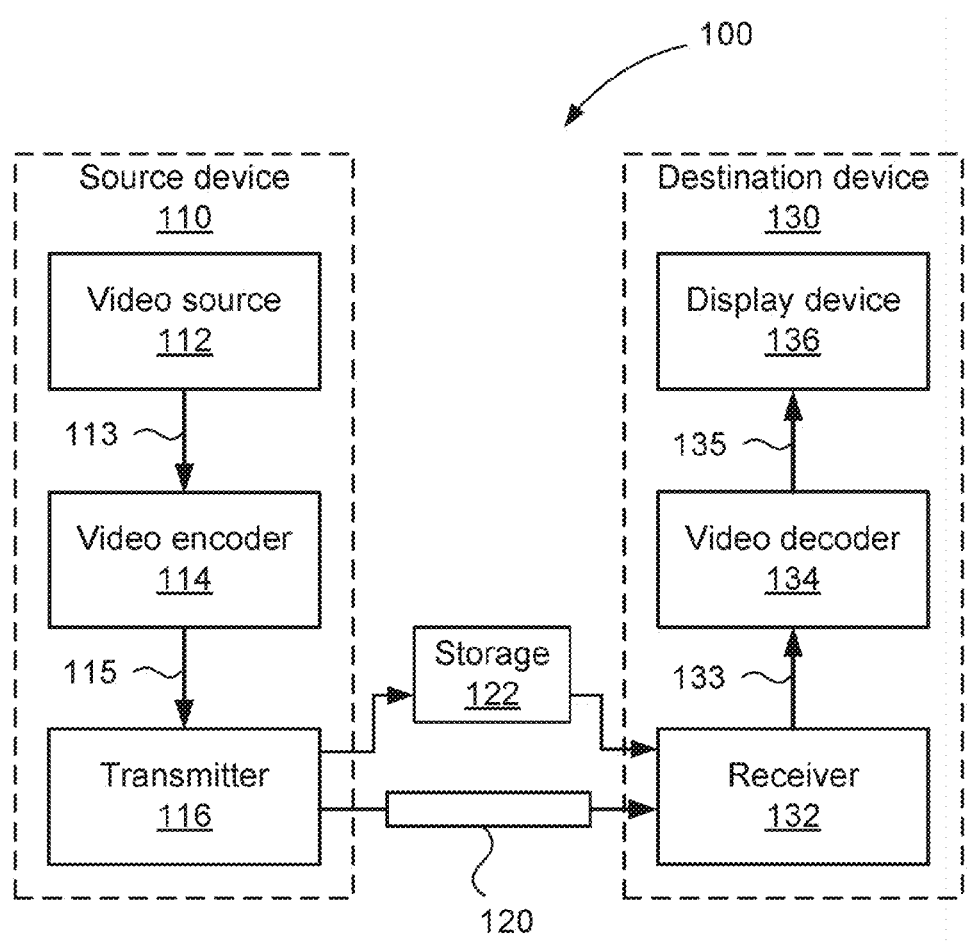
FIG. 1 illustrates an example of a next-generation communication system according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted.

Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings.

However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

In the following description, some of terms and names defined in the 3rd generation partnership project (3GPP) standards (standards for 5G, NR, long term evolution (LTE), or similar systems) may be used for the convenience of description. Moreover, terms and names newly defined in a next-generation communication system (e.g., 6G or beyond 5G system) to which the disclosure is applicable or employed in the existing communication systems may also be used. The use of terms and names is not limited by the terms and names of the disclosure, and the disclosure may be applied in the same way to systems that conform other standards and may be changed into other forms without departing from the technical idea of the disclosure.

In an embodiment of the disclosure, it is to be understood that the singular forms "a," "an," and "the" include plural referents unless the context clearly dictates otherwise.

In an embodiment of the disclosure, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

In an embodiment of the disclosure, the term "and/or" includes any one of any combination of multiple relevant items enumerated.

The terms used in the disclosure are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Furthermore, as used in the disclosure, the expression "greater than" or "less than" is used to determine whether a specific condition is satisfied or fulfilled, but this is intended only to illustrate an example and does not exclude "greater than or equal to" or "equal to or less than." A condition indicated by the expression "greater than or equal to" may be replaced with a condition indicated by "greater than," a condition indicated by the expression "equal to or less than" may be replaced with a condition indicated by "less than," and a condition indicated by "greater than and equal to or less than" may be replaced with a condition indicated by "greater than and less than."

Prior to a detailed description of the disclosure, examples of interpretable meanings of some terms used in this specification are provided. However, it should be noted that the terms are not limited to the examples of the interpretable meanings which are provided below.

In the present disclosure, a terminal (or communication terminal) is a subject communicating with a base station or another terminal, and may be referred to as a node, a user equipment (UE), a next-generation UE (NG UE), a mobile station (MS), a device, a terminal, or the like. Further, the terminal may include, for example, at least one of a smartphone, a tablet PC, a mobile phone, a video phone, an e-book reader, a desktop PC, a laptop PC, a netbook computer, a PDA, a portable multimedia player (PMP), a MP3 player, a medical device, a camera, or a wearable device. In addition, the terminal may include, for example, at least one of a television, a digital video disk (DVD) player, audio, refrigerator, air conditioner, vacuum cleaner, oven, microwave, washing machine, air purifier, set-top box, home automation control panel, security control panel, media box, game console, an electronic dictionary, an electronic key, a camcorder, or an electronic frame. In addition, the terminal may include at least one of various medical devices (e.g., various portable medical measuring devices (blood glucose meter, heart rate meter, blood pressure meter, or body temperature meter, etc.), magnetic resonance angiography (MRA), magnetic resonance imaging (MRI), computed tomography (CT), camera, ultrasound device, navigation device, global navigation satellite system (GNSS), event data recorder (EDR), flight data recorder (FDR), automobile infotainment device, ship electronics equipment (e.g., marine navigation devices, gyro compasses, etc.), avionics, security devices, vehicle head units, industrial or home robots, drones, ATMs in financial institutions, point of sales (POS) in stores, or Internet of Things devices (e.g., light bulbs, various sensors, sprinkler devices, fire alarms, temperature controllers, street lights, toasters, exercise equipment, hot water tanks, heaters, boilers, etc.). In addition, the terminal may include various types of multimedia systems capable of performing communication functions. Meanwhile, the disclosure is not limited to the above description, and a terminal may be referred to using a term having the same or similar meaning thereof.

In addition, in the disclosure, a base station is a subject communicating with a terminal and performing resource allocation of the terminal, and may have various forms and be referred to as a base station (BS), a nodeB (NB), a next-generation radio access network (NG RAN), an access point (AP), a transmission and reception point (TRP), a satellite base station, a radio access unit, a base station controller, or a node on a network. Alternatively, the base station may be referred to as a central unit (CU) or a distributed unit (DU) according to functional separation. Meanwhile, the disclosure is not limited thereto, and a base station may be referred to using a term having the same or similar meaning thereof.

In addition, in the disclosure, control information may be referred to as a control message, a control signaling, or a medium access control (MAC)-control element (CE), downlink control information (DCI), uplink control information (UCI), or a radio resource control (RRC) message according to context, and the disclosure is not limited thereto and may be referred to z a term having the same or similar meaning thereof.

Further, in the disclosure, a transmission node may be referred to as a transmitter or a first device, and may imply a terminal in case of uplink and a base station in case of downlink.

In addition, in the disclosure, a reception node may be referred to as a receiver or a second device, and may imply a base station in case of uplink and a terminal in case of downlink.

FIG. 1 illustrates an example of a next-generation communication system according to an embodiment of the present disclosure.

Referring to FIG. 1, a next-generation communication system may include a next-generation base station 1-10 and a next-generation core network (CN) 1-05. A next-generation terminal 1-15 may access an external network via the next-generation base station 1-10 and the next-generation CN 1-05.

In FIG. 1, the next-generation base station 1-10 may play a role corresponding to an eNB of an existing LTE communication system or a NR base station (gNB) of an NR communication system. Alternatively, in embodiments of the disclosure, the next-generation base station 1-10 may refer to an LTE base station or a NR base station. The next-generation base station 1-10 may be connected to the terminal 1-15 through a radio channel, and may provide a superior communication service than the existing node B. The next-generation core network 1-05 may play a role corresponding to the NR core network of the NR communication system. In addition, a next-generation communication system to which the disclosure is applicable may operate in conjunction with the existing LTE communication system or NR communication system. When interworking with the LTE communication system, the next-generation communication system may be connected to a mobility management entity (MME) 1-25 through a network interface, and the MME may be connected to an eNB 1-30 which is an existing LTE base station. Alternatively, when interworking with the NR communication system, the next-generation communication system may be connected to the NR core network 1-25 through a network interface, and the NR core network 1-25 may be connected to an NR base station 1-30. Meanwhile, a next-generation communication system to which the disclosure may be applied is not limited to that shown in FIG. 1. The above-described next-generation communication system may be implemented through various types of a base station, a terminal, and a core network, and the disclosure may also be applied to these cases.

In the communication system of the disclosure, a transmitter may transmit a signal by increasing transmission power through a PA in order to increase coverage or the like. However, there is a problem in that signal distortion occurs due to a nonlinear characteristic of the PA. Hereinafter, it will be described in detail with reference to FIG. 2.

Figure 2A:
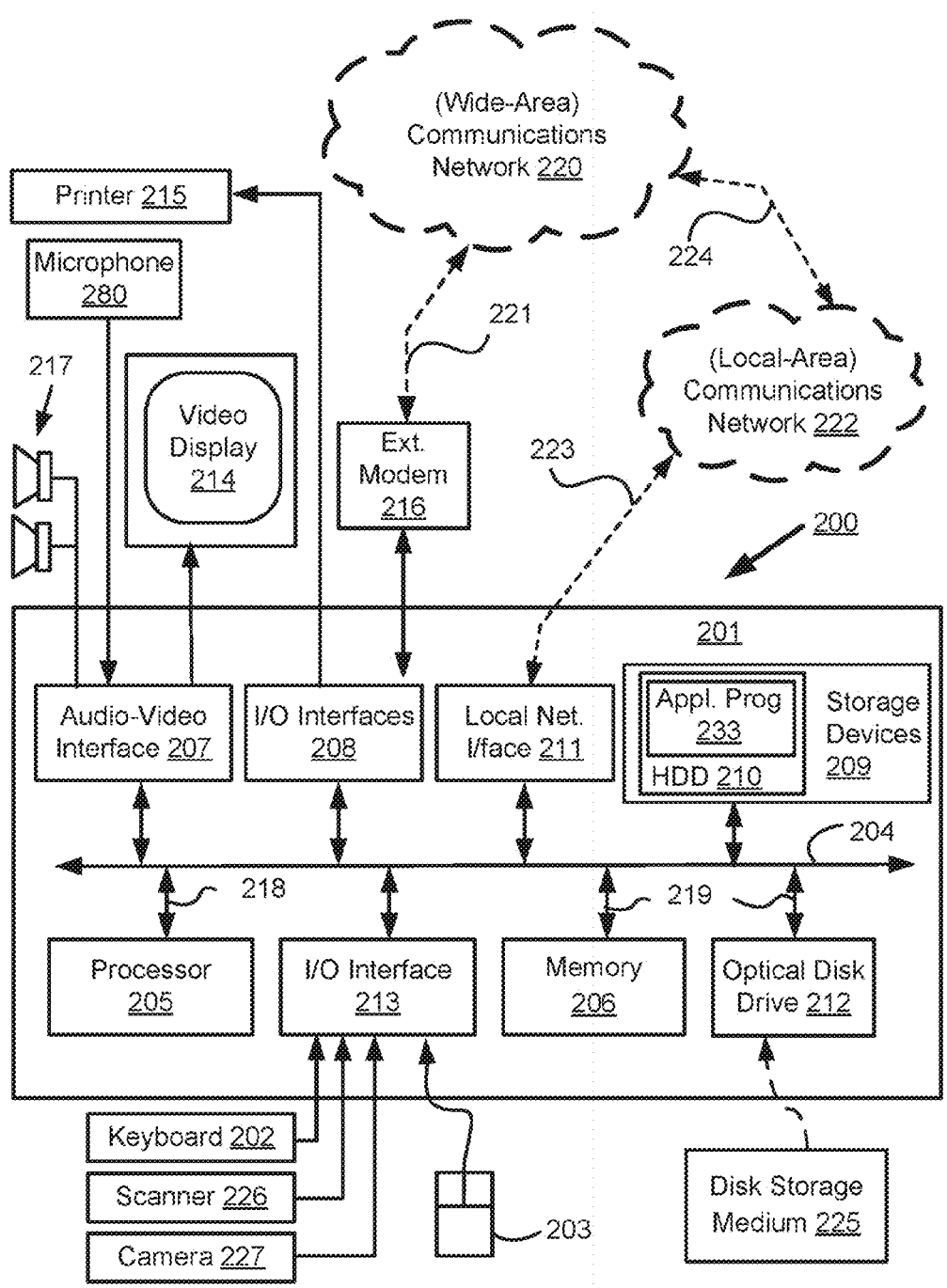
FIG. 2 illustrates an example of a signal distortion due to a nonlinearity characteristic of a PA according to an embodiment of the present disclosure.
Figure 2B:
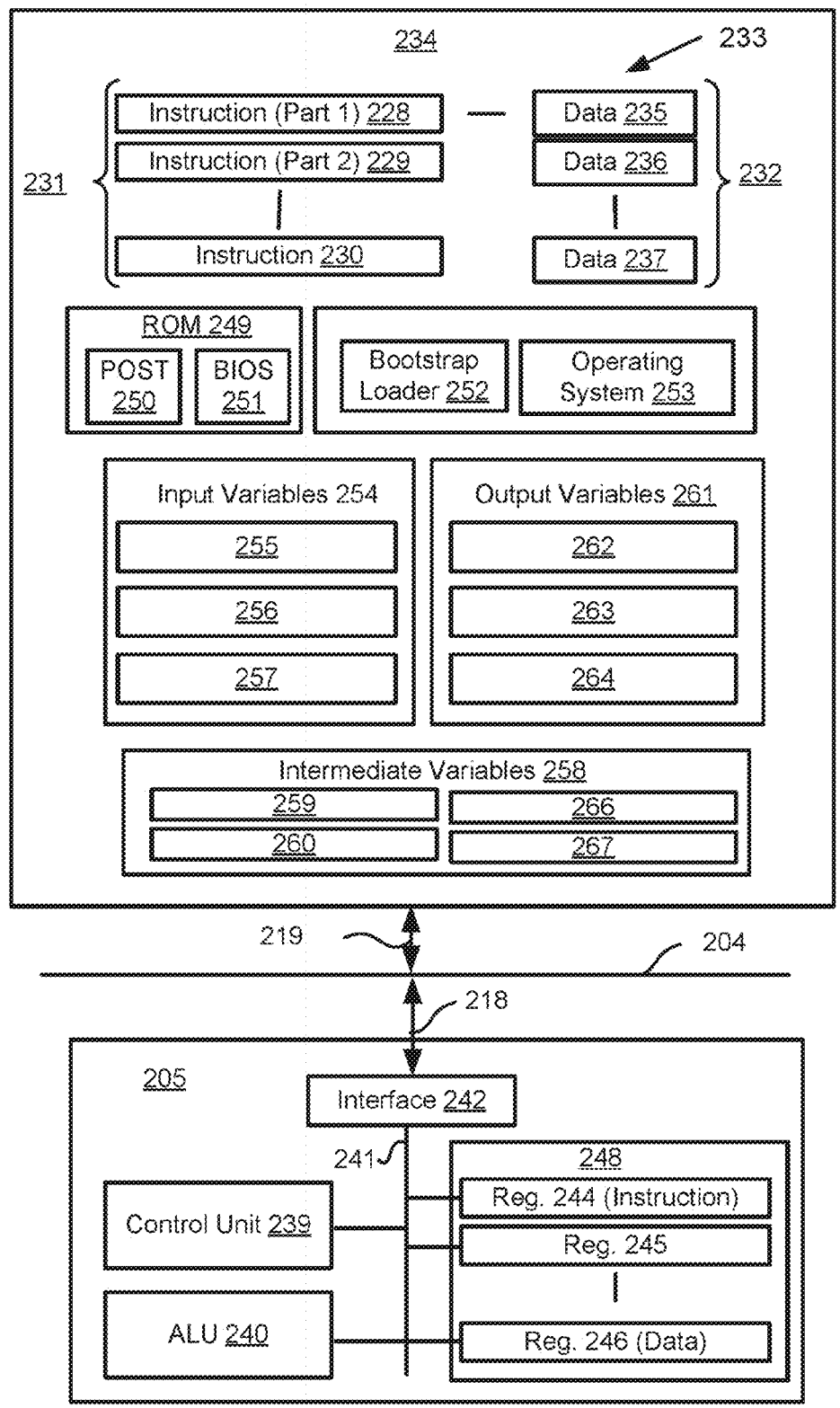

FIG. 2 illustrates an example of a signal distortion due to a nonlinearity characteristic of a PA according to an embodiment of the present disclosure.

Referring to FIG. 2, in a region where power (input power) of a signal input to the PA is small (small-signal region), linearity in which as the input power PAin increases, power (output power, PAout) of a signal output from the PA increases in proportion to the ratio of a power gain value (G) of the PA occurs. However, in a region where the input power of the PA is high, nonlinearity in which the power (PAout) of the signal output from the PA is not amplified by the power gain value (G) and the phase or amplitude is distorted occurs. The nonlinearity characteristic of the PA causes a problem of increasing an error vector magnitude (EVM) of the output signal of the PA (that is, a data symbol transmitted from a transmitter to a receiver), resulting in deterioration of data reception performance of the receiver. On the other hand, in order to avoid signal distortion caused by the nonlinearity of the PA, a scheme for applying the power back-off to limit the operating range of the PA to a range in which nonlinearity does not occur and linearity occurs has been provided. The higher the peak average power ratio (PAPR), the greater the range in which nonlinearity occurs and thus, if the range to which the back-off is applied is increased in order to avoid increasing the range in which nonlinearity occurs, the transmission power of a transmission signal is amplified with lower power, resulting in coverage reduction.

Accordingly, in a next-generation communication system such as 6G, various schemes for reducing the PAPR have been provided. For example, various schemes such as a tone reservation method for inserting a tone to reduce the PAPR and a selected mapping (SLM) method for moving an existing sequence have been provided.

Meanwhile, in addition to a scheme of reducing the PAPR to narrow the range in which nonlinearity occurs, if a receiver may compensate for the nonlinearity of a PA, a transmitter may largely narrow the range to which the back-off is applied. Therefore, the disclosure provides a method for compensating for the nonlinearity of a PA in a receiver in order to improve data reception performance. In the disclosure, a method for compensating for the nonlinearity of a PA will be referred to as a non-linearity compensation (NC), NC technology, or an NC method. However, the use of these terms does not limit the technical scope of the disclosure.

The NC technology provided in the disclosure may include (i) a process of acquiring PA input/output relationship information in a receiver, and (ii) a process of compensating for nonlinearity of a data part of a received signal based on the PA input/output relationship information. Here, the PA input/output relationship information may be obtained by comparing a pilot pattern commonly known to the transmitter and the receiver with a pilot part of a signal actually received by the receiver.

In the disclosure, a pilot may refer to various types of pilot signals or reference signals (RSs) used to match time and frequency synchronization between a transmitter and a receiver and exchange information on a channel. For example, the pilot or reference signal may include a primary synchronization signal (PSS) and a secondary synchronization signal (SSS) used for initial access, a demodulation RS (DMRS) used to estimate a channel value required during demodulation of transmission data, a channel state information-RS (CSI-RS) used by a terminal to estimate a downlink channel state, and a sounding RS (SRS) used by a base station to estimate an uplink channel state. A time and/or a frequency resource, a periodicity, a sequence type, and the like of the pilot signal or reference signal may be predefined or preconfigured in common for the transmitter and the receiver. In addition, the transmitter may determine the transmission power of the pilot as an appropriate value by considering a communication system and environment and reception power targeted by the receiver.

Hereinafter, in the disclosure, for convenience of explanation, the pilot signal or reference signal (RS) may be collectively referred to as the term of "pilot." However, the use of these terms does not limit the technical scope of the disclosure, and may be replaced by terms such as a pilot signal, a pilot symbol, a reference signal, and the like.

Figure 3:
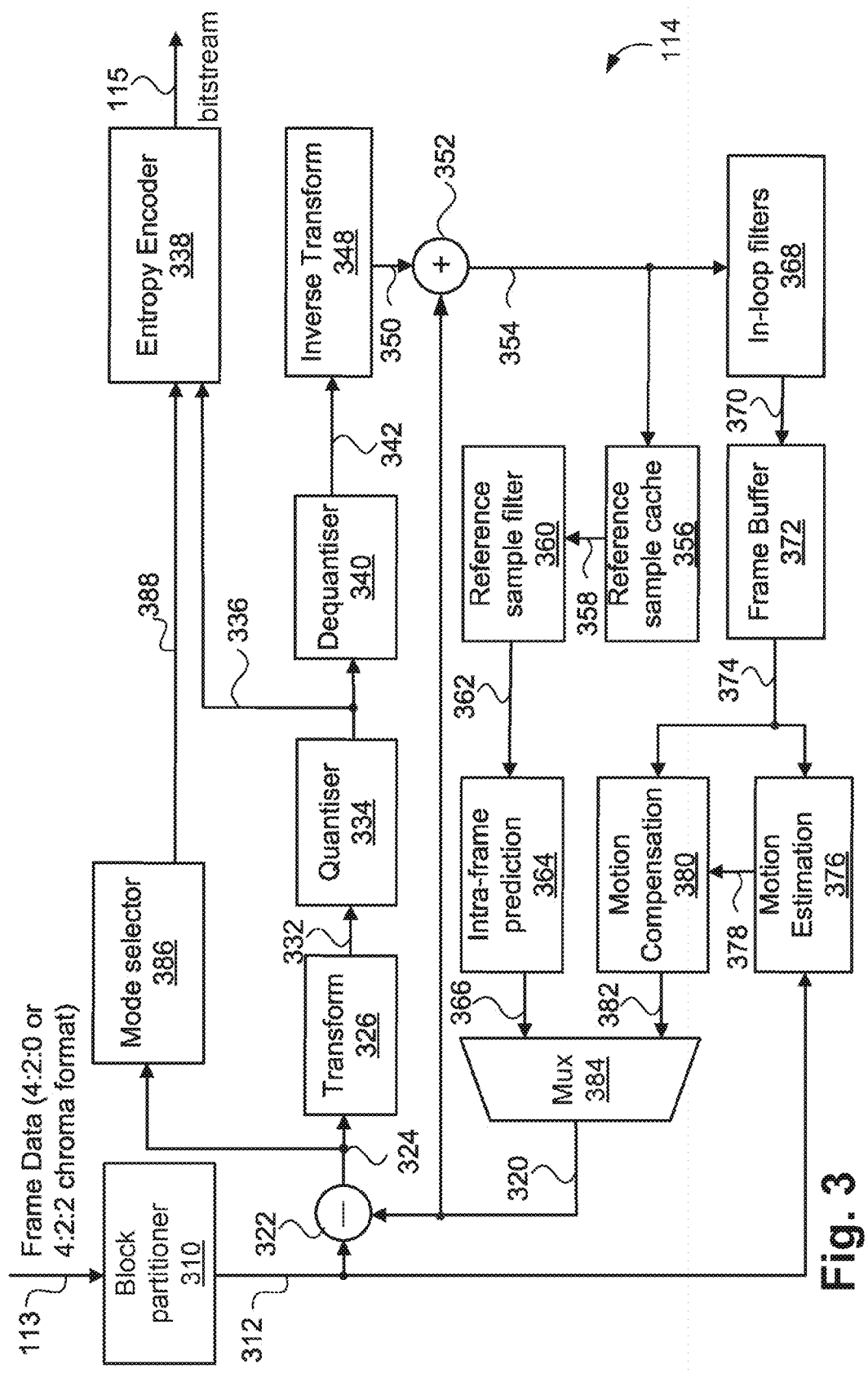
FIG. 3 illustrates an example of a process for compensating the nonlinearity according to an embodiment of the present disclosure.

FIG. 3 illustrates an example of a process for compensating the nonlinearity according to an embodiment of the present disclosure.

Referring to FIG. 3, a process of obtaining a signal from which distortion due to nonlinearity is removed by compensating for PA nonlinearity for a signal (PAout) having transmission power amplified through the PA is illustrated.

The receiver of the disclosure may obtain PA input/output relationship information (e.g., a relationship between input power (PAin) and output power (PAout) of the PA), and may compensate for the nonlinearity for a received signal according to the obtained PA input/output relationship information. For example, the receiver may obtain a signal from which distortion due to the PA nonlinearity is removed by applying the PA input/output relationship information to a received signal (output signal of the PA on a transmitter side, PAout), and may decode and process the signal. Accordingly, signal (or data) reception performance of the receiver can be improved. In addition, since the transmitter can transmit signals with higher power by not applying the back-off or greatly reducing the range to which the back-off is applied, the coverage of the transmitter can be improved. Hereinafter, a series of processes in which the transmitter transmits a signal through the PA and the receiver compensates for nonlinearity of the PA will be described with reference to FIG. 4.

Figure 4:
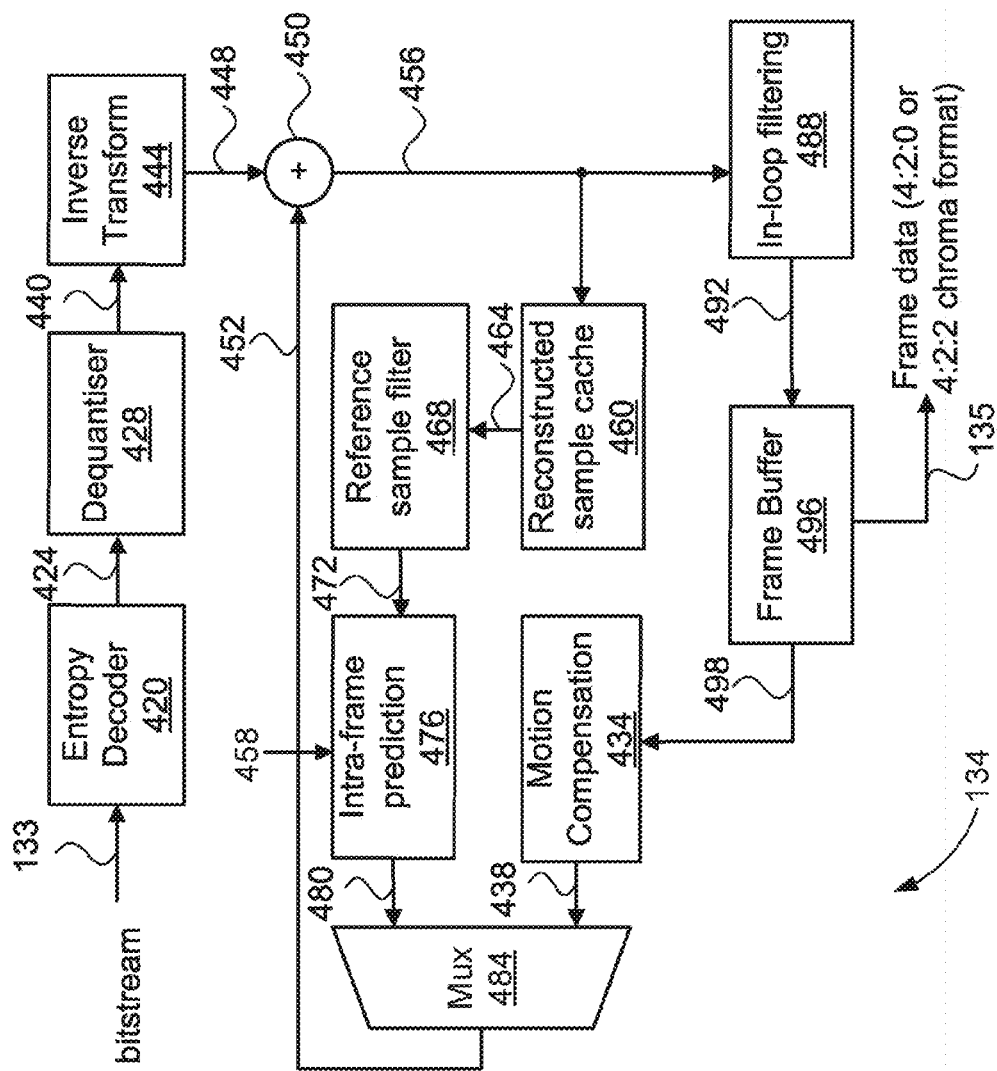
FIG. 4 illustrates an example of a signal transmission path on a transmitter side and a signal reception path on a receiver side according to an embodiment of the present disclosure.

FIG. 4 illustrates an example of a signal transmission path on a transmitter side and a signal reception path on a receiver side according to an embodiment of the present disclosure.

In the case of downlink, a transmitter may refer to a base station, and a receiver may refer to a terminal. In the case of uplink, the transmitter may refer to a terminal and the receiver may refer to a base station. Meanwhile, an OFDM modulation scheme may be applied in the transmitter of FIG. 4 and the OFDM demodulation scheme may be applied in the receiver.

Referring to FIG. 4, a signal transmission path on the transmitter side may include a channel coding block, a modulation block, an inverse fast Fourier transform (IFFT) block, a cyclic prefix (CP) insertion block, a digital to analog converter (DAC), and a PA block.

The channel coding block may receive a set of information bits and apply channel coding (e.g., low-density parity identify (LDPC)) thereto. The modulation block may modulate (e.g., quadrature phase shift keying (QPSK) or quadrature amplitude modulation (QAM)) the input bits to generate a sequence of frequency domain modulation symbols. The IFFT block may generate time domain output signals by performing IFFT operations on parallel symbol streams. The CP addition block may insert a CP to a time domain signal. A digital signal may be converted into an analog signal through the DAC block. Thereafter, in order to improve coverage, transmission power may be amplified through the PA block and an RF signal may be transmitted.

On the other hand, a signal reception path of the receiver side may include a low noise amplifier (LNA) block, an analog to digital converter (ADC) block, a sync block, a CP removal and fast Fourier transform (FFT) block, a channel equalization (EQ) block, an inverse fast Fourier transform (IFFT) block, a non-linearity compensation (NC) block, a fast Fourier transform (FFT) block, a demodulation block, and a channel decoding block.

The LNA block may amplify the received RF signal. The ADC block may convert an analog signal into a digital signal. The sync block may perform synchronization on signals. The CP removal and FFT block may remove CP and convert a time domain signal into a frequency domain signal through FFT. The channel EQ block may perform channel estimation and channel EQ based on a frequency domain signal. Thereafter, the IFFT block may convert a signal to which channel EQ is applied into a time domain signal through IFFT. The NC block may perform non-linearity compensation for the time domain signal. For example, the NC block may obtain non-linearity information indicating signal distortion or the like caused by the nonlinearity of a PA used in the transmitter, and perform non-linearity compensation for the time domain signal based on the non-linearity information.

For example, AI-based non-linearity compensation may be performed in the NC block. The NC block may train an AI model by inputting a pilot part of the signal to which channel EQ is applied to the AI model, and optimizing an objective function (e.g., minimizing a loss function or maximizing a utility function) regarding a difference between a result output from the AI model (a value predicted by a pilot received by the receiver) and a transmission pattern of the pilot provided from the transmitter to the receiver. That is, the NC block may train the AI model by inputting a pilot distorted due to the nonlinearity of the PA to the AI model and optimizing the value predicted by the AI model to be close to the transmission pattern of the corresponding pilot. Thereafter, the NC block may input a data part of the signal to which the channel EQ is applied to the trained AI model, so as to acquire data for which the PA nonlinearity is compensated for (that is, data from which distortion due to the PA nonlinearity is removed) as the output value of the AI model. Here, the AI model may be implemented by an AI-related algorithm including an echo state network (ESN).

As another example, non-linearity compensation may be performed without using AI in the NC block. The NC block may derive a fitted line expressing the PA input/output relationship by utilizing a pilot part of the received signal and a pilot part of the signal previously known to the receiver. Thereafter, the NC block may obtain data for which PA nonlinearity is compensated for (i.e., data from which distortion due to the PA nonlinearity is removed), as a result value by putting a data part of the signal to which the channel EP is applied to the fitting line.

A signal, for which the non-linearity of the PA is compensated for, may be converted into a frequency domain signal through the FFT block, and the original input data stream may be reconstructed by demodulating and decoding the modulated symbol through the demodulation block and the channel decoding block.

Meanwhile, some of the blocks shown in FIG. 4 may be omitted, and one block may perform the function of another block. In addition, each element shown in FIG. 4 may be implemented using only hardware or a combination of hardware and software/firmware. As an example, at least some of the elements of FIG. 4 may be implemented in software, while other elements may be implemented in configurable hardware or a combination of software and configurable hardware. For example, the FFT block and the IFFT block may be implemented as a configurable software algorithm. In addition, although described as using FFT and IFFT, this is only an example and does not limit the scope of the disclosure. Thus, other types of transforms such as discrete Fourier transform (DFT) and inverse discrete Fourier transform (IDFT) may be used.

Figure 5:
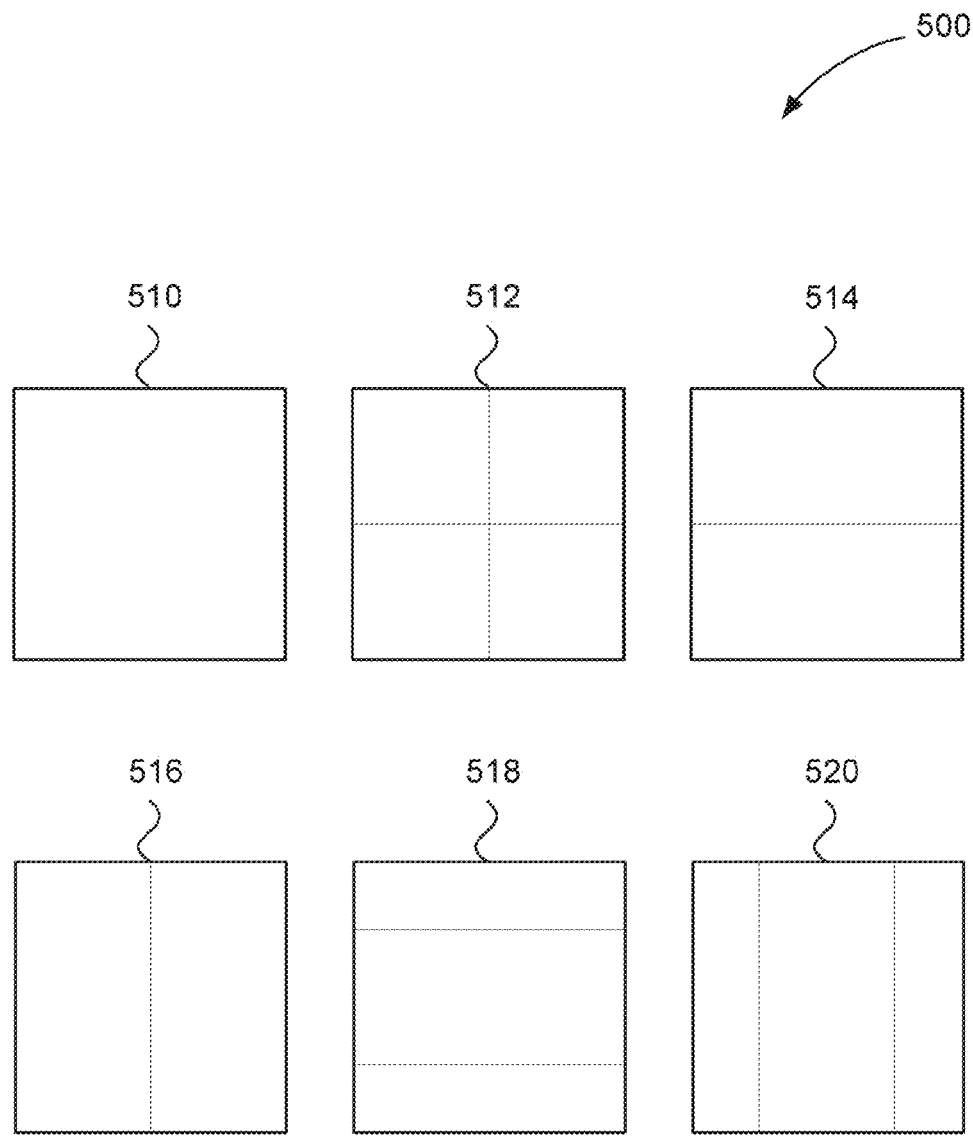
FIG. 5 illustrates an example of AI-based non-linearity compensation according to an embodiment of the present disclosure.

FIG. 5 illustrates an example of AI-based non-linearity compensation according to an embodiment of the present disclosure.

As described above, a transmitter may transmit a signal by amplifying transmission power through a PA, and a receiver may receive the signal and apply channel EQ thereto. However, as shown in A of FIG. 5, the phase or amplitude of the signal to which the channel EQ is applied may have distortion caused by the nonlinearity of the PA. Therefore, the receiver may perform non-linearity compensation on the signal to which the channel EQ is applied. The receiver may input a pilot (e.g., DMRS) part of the signal to which channel EQ is applied to an AI model, and train the AI model so that a value predicted by the AI model has a small error with a pilot transmission pattern (that is, a signal predefined between the transmitter and the receiver, and before passing through the PA in the transmitter). Thereafter, the receiver may input a data part of the signal to which the channel EQ is applied to the AI model to obtain data for which nonlinearity is compensated for.

Referring to "B" of FIG. 5, it may be seen that compared to the signal to which only the channel EQ is applied, the signal for which the nonlinearity of the PA has been compensated for is more similar to the signal before passing through the PA in the transmitter. Accordingly, data reception performance can be improved by compensating for the nonlinearity of the PA in the receiver.

As described above, since the receiver performs non-linearity compensation on the signal to which channel EQ is applied according to channel estimation, the non-linearity compensation performance of the receiver may depend on how accurate the channel estimation is and a degree to which the PA input/output relationship information obtained from the receiver reflects the actual PA input/output relationship. Accordingly, channel information and non-linearity information are required to demodulate a signal distorted due to the nonlinearity of the PA in the receiver. Meanwhile, the receiver may use a pilot to acquire channel information and non-linearity information, which will be described in detail with reference to FIG. 6.

Figure 6:
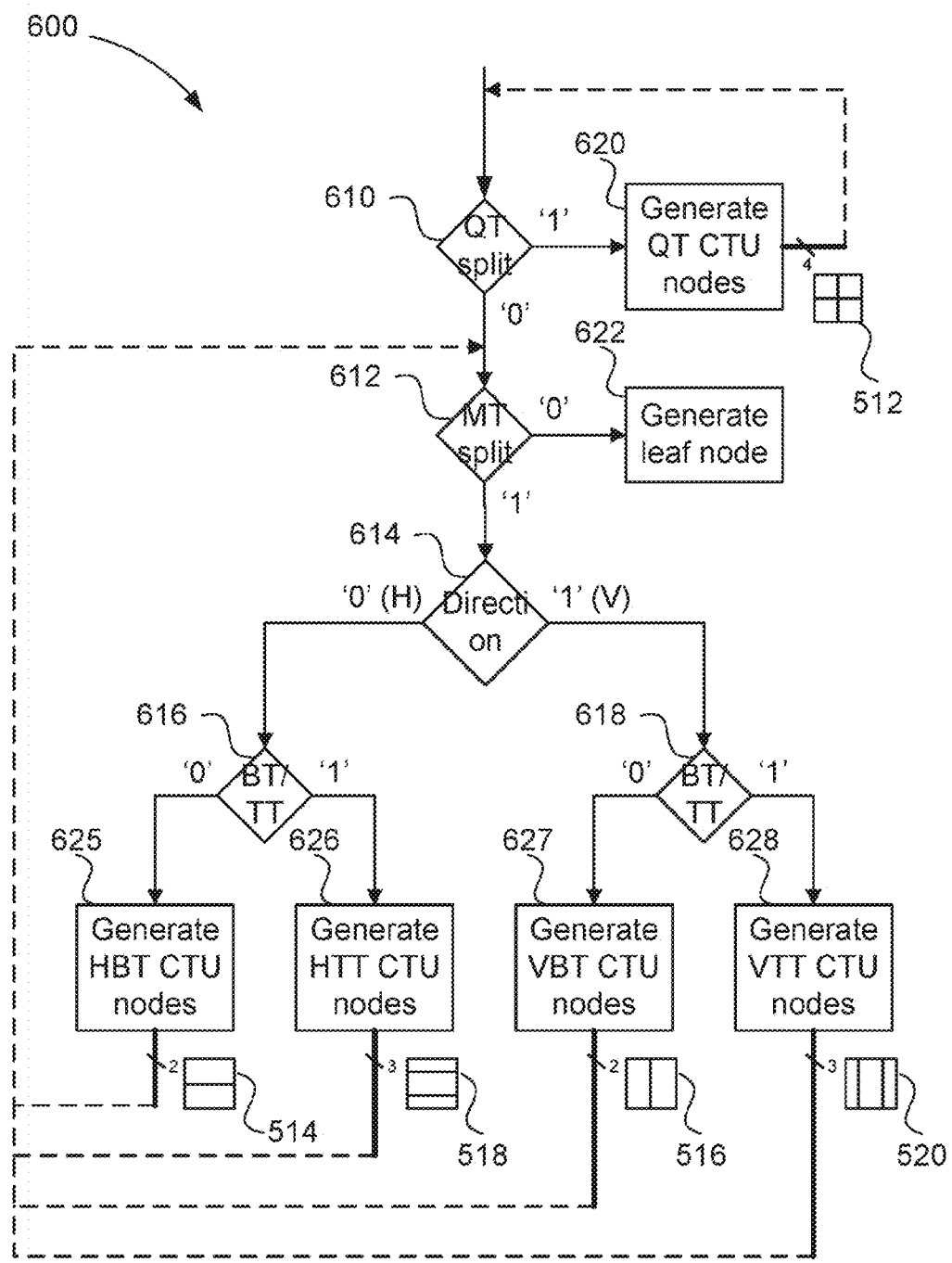
FIG. 6 illustrates an example of a pilot-based non-linearity compensation process according to an embodiment of the present disclosure.

FIG. 6 illustrates an example of a pilot-based non-linearity compensation process according to an embodiment of the present disclosure.

As described in FIG. 4, a signal reception path of a receiver side of the disclosure may include an LNA block, an ADC block, a sync block, CP removal and DFT block, a channel EQ block, an IDFT block, an NC block, a DFT block, a demodulation block, and a channel decoding block. In FIG. 6, a channel EQ block related to channel information acquisition and an NC block related to non-linearity information acquisition will be mainly described.

Referring to FIG. 6, a transmitter may transmit a signal including a pilot and data to the receiver by amplifying transmission power through the PA. Here, the pilot may be transmitted at a commonly predefined or preconfigured location between the transmitter and the receiver. For example, as shown in FIG. 6, the pilot may be transmitted in symbols having symbol indices of k, l, and m in a signal.

The receiver may perform channel estimation based on the pilot and perform channel EQ on a received signal according to channel information, which is a result of the channel estimation. In addition, the receiver may obtain non-linearity information indicating PA input/output relationship and the like based on the same pilot as that used for channel estimation, and may compensate for nonlinearity of data of a signal, to which channel EQ has been applied, according to the non-linearity information. Therefore, accurate channel information and non-linearity information are required for a receiver to have excellent non-linearity compensation performance.

Figure 7A:
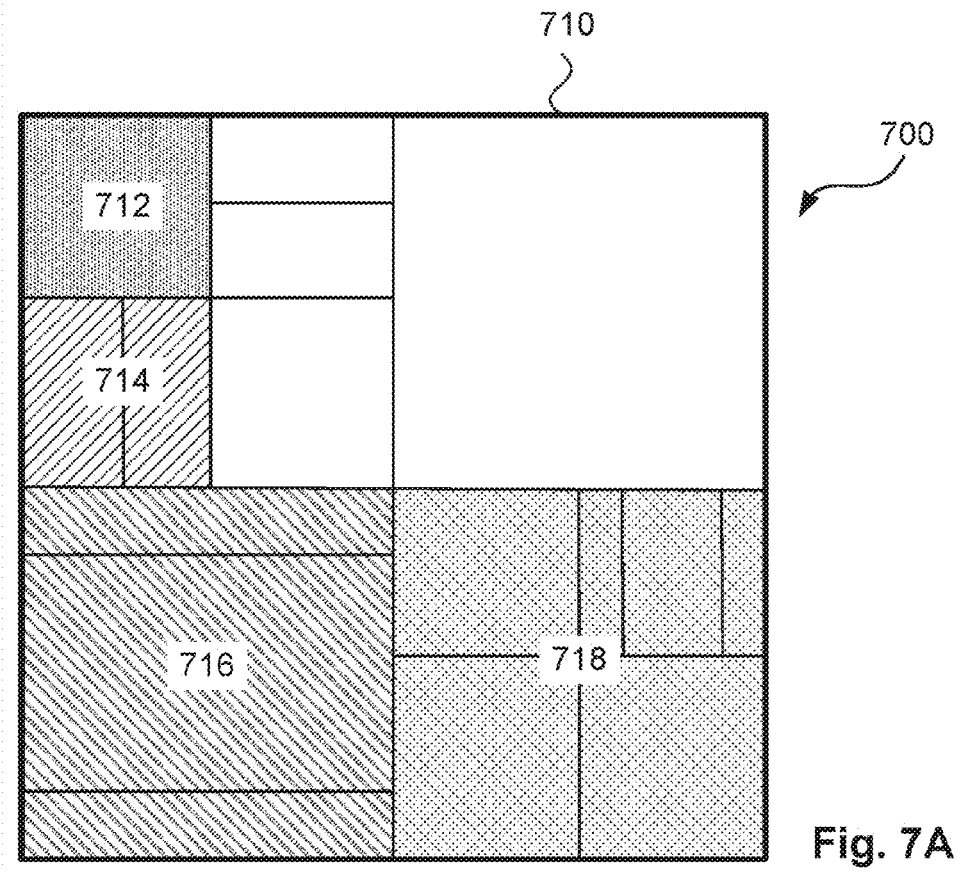
FIG. 7 illustrates an example of non-linearity compensation performance according to channel information in an embodiment of the present disclosure.
Figure 7B:
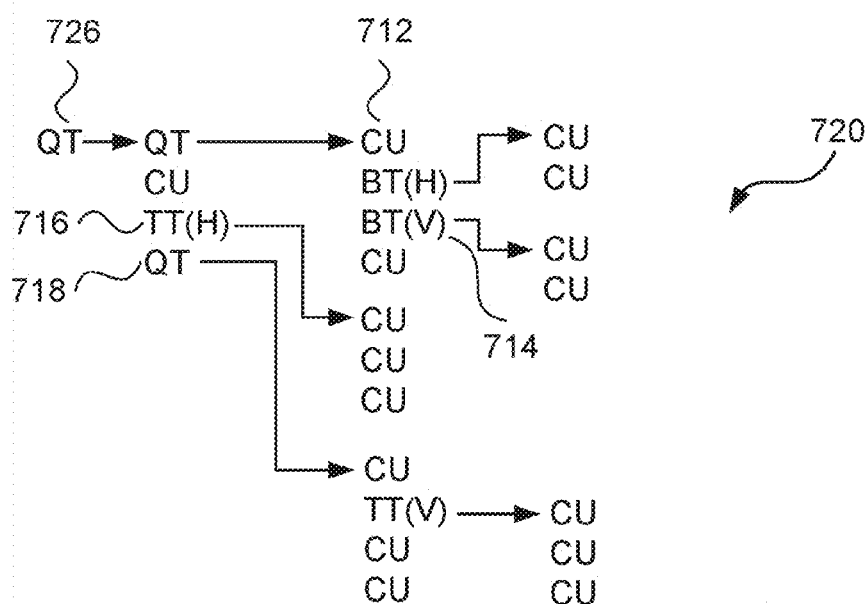
Figure 8:
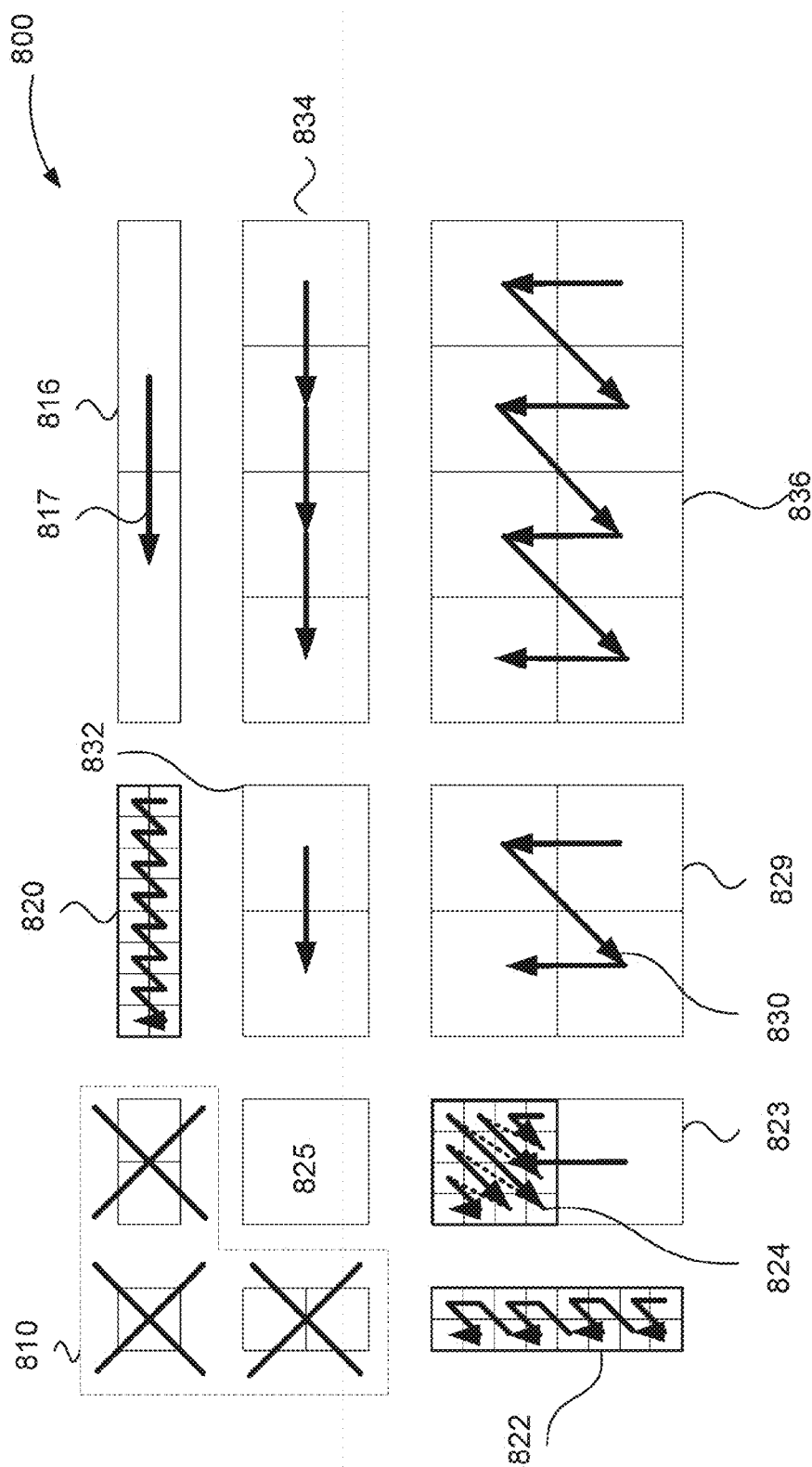
FIG. 8A illustrates an example of a channel estimation result according to distortion due to the nonlinearity which a pilot experiences according to an embodiment of the present disclosure.
FIG. 8B illustrates an example of non-linearity compensation performance based on non-linearity information according to an embodiment of the present disclosure.
Figure 9:
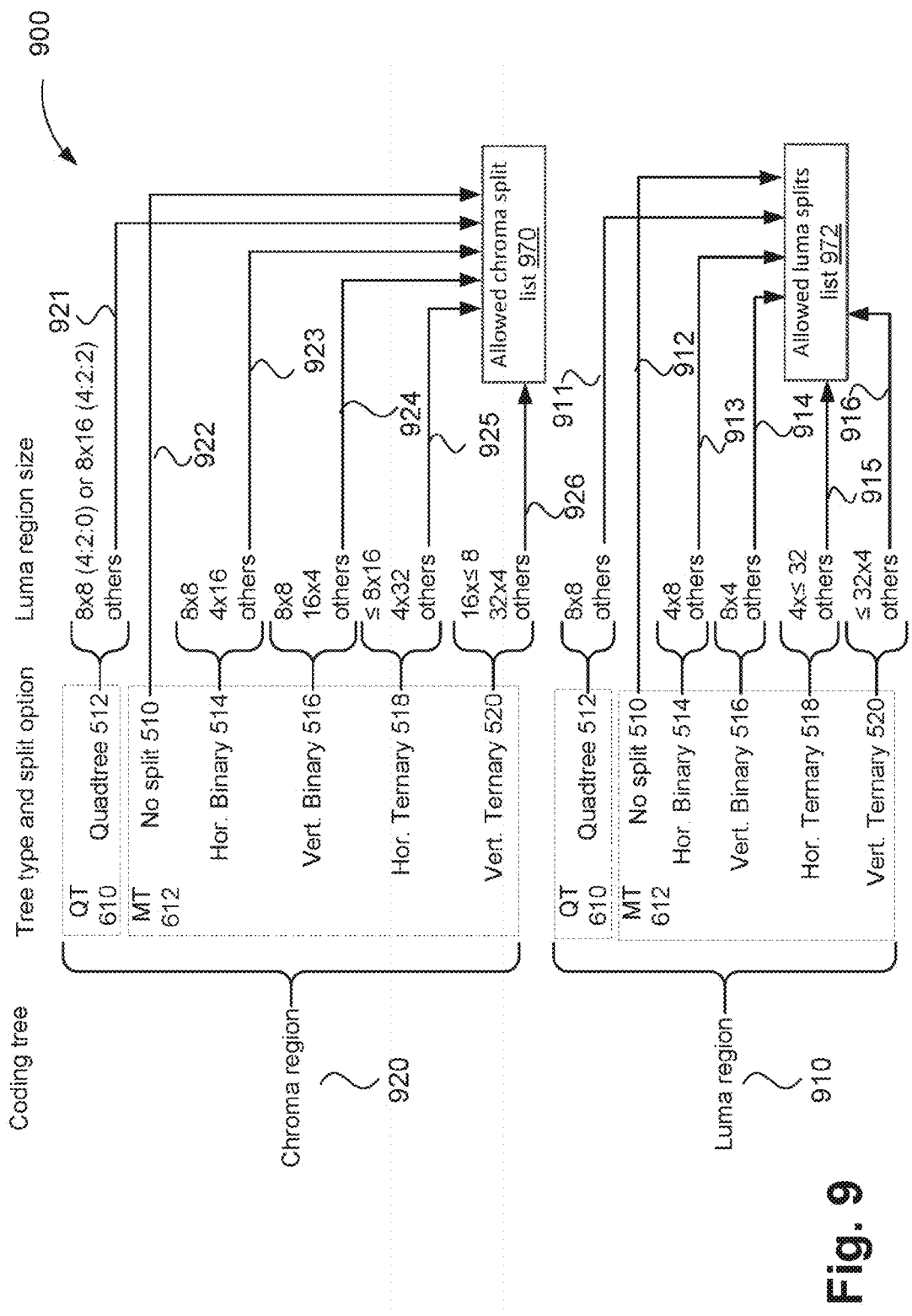
FIG. 9A illustrates an example of selecting a first pilot for channel information acquisition and a second pilot for non-linearity information acquisition according to an embodiment of the present disclosure.
FIG. 9B illustrates another example of selection of a first pilot for channel information acquisition and a second pilot for non-linearity information acquisition according to an embodiment of the present disclosure.

FIG. 7 illustrates an example of non-linearity compensation performance according to channel information in an embodiment of the present disclosure.

Referring to FIG. 7, when a receiver knows accurate channel information (e.g., perfect CSI), the receiver may compensate for the nonlinearity to be close to a theoretically calculated value. Therefore, it is important to acquire accurate channel information in order to guarantee excellent non-linearity compensation performance of the receiver.

On the other hand, accurate channel information may be obtained only in case that a pilot having less distortion due to the nonlinearity of the PA may be used, whereas non-linearity information to which the input/output relationship of the PA is well reflected may be obtained only in case that a pilot having sufficient distortion due to the nonlinearity of the PA may be used.

Hereinafter, characteristics of pilots for acquiring channel information and characteristics of pilots for acquiring non-linearity information will be described with reference to FIGS. 8A and 8B.

FIG. 8A illustrates an example of a channel estimation result according to distortion due to the nonlinearity which a pilot experiences according to an embodiment of the present disclosure.

Referring to FIG. 8A, the larger the nonlinearity (e.g., EVM) which a pilot experiences, the larger the channel estimation error of the pilot. In contrast, the smaller the nonlinearity (e.g., 2.5 EVM) which a pilot experiences, the smaller the channel estimation error of the pilot. Therefore, in order to obtain accurate channel information, a pilot having experienced the smaller nonlinearity (or a pilot having less distortion due to nonlinearity) is required to be used.

FIG. 8B illustrates non-linearity compensation performance based on non-linearity information according to an embodiment of the disclosure.

Referring to FIG. 8B, it may be identified that since the size distribution characteristics of a data part and a pilot part are similar, the more sufficient nonlinearity which a pilot experiences, the more accurate nonlinearity information may be obtained through the pilot. Therefore, in order to obtain accurate non-linearity information, a pilot having experienced the more sufficient nonlinearity (or a pilot having relatively large distortion due to nonlinearity) is required to be used.

As described above, it is important to acquire accurate channel information and accurate non-linearity information in order to guarantee excellent PA non-linearity compensation performance of the receiver. Here, in order to obtain accurate channel information, a pilot having experienced the smaller nonlinearity is required, and in order to obtain accurate non-linearity information, a pilot having experienced the more sufficient nonlinearity is required. Therefore, if the same pilot is used to acquire channel information and non-linearity information as shown in FIG. 6, the receiver may not acquire accurate channel information and non-linearity information.

Accordingly, the disclosure provides a method for multi-pilot operation for different usages (or objectives), such as a pilot for channel information acquisition and a pilot for non-linearity information acquisition. Specifically, the disclosure provides a signaling method for appropriately selecting and arranging pilots for each usage and transferring pilot information for each usage to a transmitter and a receiver, and a method for performing, by a receiver, a data reception process including nonlinearity compensation by obtaining channel estimation and non-linearity information based on the pilot information for each usage.

Hereinafter, in the disclosure, a method in which a base station selects a pilot for each usage and transmits pilot information for each usage to a transmitter and a receiver will be mainly described. However, this is for convenience of explanation and does not limit the technical scope of the disclosure, and a method in which a terminal selects a pilot for each usage and transmits the pilot information for each usage to a transmitter and a receiver is also possible. In this case, in the following description, the base station may be interchangeably used with the terminal.

Hereinafter, in the disclosure, for convenience of explanation, a pilot for channel information acquisition is described as a "first pilot" and a pilot for non-linearity information acquisition as a "second pilot." However, the use of these terms does not limit the technical scope of the disclosure, and may be replaced with other terms that distinguish the usage of pilots.

FIG. 9A illustrates an example of selection of a first pilot and a second pilot according to an embodiment of the present disclosure, and FIG. 9B illustrates another example of selection of a first pilot and a second pilot according to an embodiment of the present disclosure.

A base station of the disclosure may select the first pilot and the second pilot.

The base station may select a pilot which experiences the smaller nonlinearity as the first pilot. For example, in case that a signal-to-noise ratio is sufficiently large, the base station may perform power scaling of a previously generated pilot by multiplying the same by a value less than 1 and select the power-scaled pilot as the first pilot. According to a nonlinearity characteristic of a PA, the greater the magnitude of an input signal, the larger the nonlinearity which a pilot experiences. In order to reduce the nonlinearity which a pilot experiences, the base station may reduce the strength of the pilot through power scaling of the plot by multiplying the same by a value less than 1, and then select this pilot as the first pilot.

As another example, the base station may compare signal characteristics including a PAPR or the like and select a pilot which experiences the smaller nonlinearity as the first pilot. Here, in case that a transmitter (a terminal in case of uplink, or a base station in case of downlink) may transmit a specific pilot for channel information to a specific location, the base station may compare signal characteristics including s PAPR and select, as the first pilot, a pilot which experiences the smaller nonlinearity among selectable candidate pilots. For example, the base station may select at least one pilot having a PAPR equal to or less than (or below) a specific value from among selectable candidate pilots as the first pilot. Meanwhile, the selectable candidate pilots may include one or more pilots selected based on at least one of a PAPR, a peak value of the input signal (PAin) or output signal (PAout) of the PA, and a size distribution characteristic of the input signal (PAin) of the PA. The base station may classify (or group) pilots according to at least one of a PAPR, a peak value of the input signal (PAin) or output signal (PAout) of the PA, and a size distribution characteristic of the input signal (PAin) of the PA, and select a pilot from among the classified selectable candidate pilots.

As another example, in case that a transmitted pilot and a location thereof are fixed, the base station may compare signal characteristics including a PAPR of the transmitted pilots, and select a pilot which experiences the relatively smaller nonlinearity as the first pilot. For example, the base station may select, as a first pilot, at least one pilot having a PAPR equal to or less than (or below) a specific value from among transmitted pilots.

In addition, the base station may select a pilot which experiences the larger nonlinearity as a second pilot. For example, the base station may perform power scaling of a previously generated pilot by multiplying the same by a value greater than 1 by considering a size distribution characteristic of a data part and a pilot part, and select this power-scaled pilot as the second pilot. According to the nonlinearity characteristic of the PA, the greater the magnitude of the input signal, the larger the nonlinearity which a pilot experiences. In order to increase the nonlinearity which a pilot experiences, the base station may increase the strength of the corresponding pilot through power scaling of the pilot by multiplying the same by a value greater than 1, and then select this pilot as the second pilot.

As another example, the base station may compare signal characteristics including a PAPR and the like, and select a pilot which experiences the larger nonlinearity as the second pilot. Here, in case that a transmitter (a terminal in case of uplink, or a base station in case of downlink) may transmit a specific pilot to a specific location in order to obtain non-linearity information, the base station may compare signal characteristics including a PAPR and select, as the second pilot, a pilot which experiences the more sufficient nonlinearity among selectable candidate pilots. For example, the base station may select, as the second pilot, at least one pilot having a PAPR greater than or equal to (or exceeding) a specific value from among selectable candidate pilots. Meanwhile, the selectable candidate pilots may include one or more pilots selected based on at least one of a PAPR, a peak value of the input signal (PAin) or output signal (PAout) of the PA, and a size distribution characteristic of the input signal (PAin) of the PA. The base station may classify (or group) the pilots according to at least one of a PAPR, a peak value of the input signal (PAin) or output signal (PAout) of the PA, and a size distribution characteristic of the input signal (PAin) of the PA, and select a pilot from among the classified selectable candidate pilots.

As another example, when a transmitted pilot and a location thereof are fixed, the base station may select a pilot which experiences the more sufficient nonlinearity as the second pilot by comparing signal characteristics including a PAPR of the transmitted pilots. For example, the base station may select, as the second pilot, at least one pilot having a PAPR equal to or greater than (or exceeding) a specific value from among transmitted pilots.

Meanwhile, in the disclosure, a method in which the base station selects the first pilot and the second pilot is not limited to the above example. The base station may select the first pilot and the second pilot according to various methods by considering a channel characteristic or a PA characteristic.

Referring to FIG. 9A, in case that a pilot can be transmitted at symbol indices of k, l, m, and n, the base station may select a first pilot and a second pilot by considering a signal characteristic such as a PAPR.

For example, the base station may compare PAPR (PAPRk) of a pilot that can be transmitted at symbol index k, PAPR (PAPRl) of a pilot that can be transmitted at symbol index l, PAPR (PAPRm) of a pilot that can be transmitted at symbol index m, and PAPR (PAPRn) of a pilot that can be transmitted at symbol index n, so as to select a pilot having the largest PAPR (e.g., a pilot of symbol index l) as the second pilot, and select the remaining pilots as the first pilot. (e.g., pilots of symbol indices k, m, and n).

Alternatively, the base station may list the pilots in PAPR sequence, select N pilots from the pilot having the largest PAPR as the second pilot, and select the remaining pilots as the first pilot. Here, N may be a predetermined value according to a channel characteristic or a PA characteristic.

On the other hand, according to a degree to which the channel characteristic and PA characteristic (the input/output relationship of the PA) change, the base station may differently configure transmission frequency of a pilot for each usage. The PA characteristic (the input/output relationship of the PA) may change according to a modulation scheme (QPSK, 64 QAM, 256 QAM, etc.), ambient temperature, humidity, frequency band, or scheduling of a pilot part and a part of a signal. In addition, the channel characteristic may change according to the movement, arrangement, and movement speed of surrounding objects. The degree to which the characteristic changes may be determined by measuring a correlation over time between a previously acquired characteristic and a newly acquired characteristic. For example, the base station may identify the change in PA characteristic based on a modulation scheme (QPSK, 64 QAM, 256 QAM, etc.), ambient temperature, humidity, frequency band, or scheduling of the pilot part and data part of the signal. In addition, the base station may identify the change in channel characteristics by measuring the correlation over time of the pilot or channel information received from the transmitter or the receiver.

For example, when the channel characteristic changes frequently compared to PA characteristic, it may be difficult to obtain accurate channel information. Accordingly, the base station may configure a transmission frequency of the first pilot to be higher than a transmission frequency of the second pilot. For example, a plurality of first pilots may be configured to be transmitted while the second pilot is transmitted once.

On the other hand, when the PA characteristic changes frequently compared to the channel characteristic, it may be difficult to obtain accurate non-linearity information. Accordingly, the base station may configure a transmission frequency of the second pilot to be higher than a transmission frequency of the first pilot.

Meanwhile, when the first pilot or the second pilot is selected through power scaling, a degree of change in transmission power of the transmitter (a terminal in case of uplink, or a base station in case of downlink) may be large. For example, as shown in FIG. 9B, the transmitter may transmit a first pilot power-scaled by a value less than 1 at symbol indices k, m, and n, and may transmit a second pilot power-scaled by a value greater than 1 at symbol index l.

Due to such power scaling, the transmission power of the transmitter frequently changes. Therefore, in order to minimize the degree of change in the transmission power of the transmitter, the base station may configure a part of the first pilot or the second pilot to be transmitted at the very beginning or at the very end of the transport block. Alternatively, the base station may configure the first pilot to be transmitted at the very beginning of the transport block and the second pilot to be transmitted at the very end of the transport block. Alternatively, the base station may configure the first pilot to be transmitted at the very end of the transport block and the second pilot to be transmitted at the very beginning of the transport block. Alternatively, the base station may be configured to perform transmission in a sequence of at least one first pilot, at least one second pilot, and data in the transport block. Alternatively, the base station may be configured to perform transmission in a sequence of at least one second pilot, at least one first pilot, and data in the transport block.

The base station may select the first pilot or the second pilot and provide pilot information for each usage to the transmitter or the receiver. The transmitter may transmit the first pilot or the second pilot to the receiver according to pilot information for each usage. The receiver may obtain channel information based on the first pilot and non-linearity information based on the second pilot according to the pilot information for each usage.

Meanwhile, pilot information for each usage may be semi-statically determined and transmitted. For example, the pilot information for each usage may include a look-up table composed of rows indicating a transmission location (e.g., symbol index), a transmission periodicity, a sequence type (e.g., DMRS, CSI-RS, SRS, etc.), or a power scaling value of each pilot. For example, the lookup table may be as shown in Table 1 below. Meanwhile, [Table 1] is only an example for explaining the embodiment, and the disclosure is not limited thereto.

TABLE 1

| Row | First pilot information | | | | Second pilot information | | | |
|---|---|---|---|---|---|---|---|---|
| | Transmission symbol index | Sequence type | Power scaling | ... | Transmission symbol index | Sequence type | Power scaling | ... |
| 0 | (2, 10) | (A, B) | (1.0, 1.0) | ... | (3) | (Z) | (1.0) | ... |
| 1 | (2, 10) | (A, B) | (0.8, 0.8) | ... | (3) | (Z) | (1.0) | ... |
| 2 | (2, 10) | (A, B) | (1.0, 1.0) | ... | (3) | (Z) | (1.2) | ... |
| 3 | (2, 10) | (A, B) | (0.8, 0.8) | ... | (3) | (Z) | (1.2) | ... |
| 4 | (2, 6, 10) | (A, B, C) | (1.0, 1.0, 1.0) | ... | (3) | (Z) | (1.0) | ... |
| 5 | (2, 6, 10) | (A, B, C) | (0.8, 0.8, 0.8) | ... | (3) | (Z) | (1.0) | ... |
| 6 | (2, 6, 10) | (A, B, C) | (1.0, 1.0, 1.0) | ... | (3) | (Z) | (1.2) | ... |
| 7 | (2, 6, 10) | (A, B, C) | (0.8, 0.8, 0.8) | ... | (3) | (Z) | (1.2) | ... |
| ... | ... | ... | ... | ... ... | ... | ... | ... |

Row #0 of [Table 1] may illustrate that the first pilot is transmitted in symbols having symbol indexes 2 and 10 in units of slots, the sequence type of the first pilot transmitted in a symbol having symbol index 2 is A (e.g., DMRS, CSI-RS, SRS, etc.), a power scaling value ($\alpha$) thereof is 1.0, the sequence type of the first pilot transmitted in a symbol having symbol index 10 is B (e.g., DMRS, CSI-RS, SRS, etc.), and a power scale value ($\alpha$) thereof is 1.0. In addition, the row #0 may illustrate that the second pilot is transmitted in a symbol having symbol index 3 in units of slots, and the sequence type of the second pilot transmitted in the symbol having symbol index 3 is Z (e.g., DMRS, CSI-RS, SRS etc.) and the power scaling value ($\alpha$) thereof is 1.0.

Similarly, row #4 of [Table 1] may illustrate that the first pilot is transmitted in symbols having symbol indexes 2, 6, and 10 in units of slots, the sequence type of the first pilot transmitted in a symbol having symbol index 2 is A (e.g., DMRS, CSI-RS, SRS, etc.), the power scaling value ($\alpha$) thereof is 1.0, the sequence type of the first pilot transmitted in a symbol having symbol index 6 is B (e.g., DMRS, CSI-RS, SRS, etc.), the power scale value ($\alpha$) thereof is 1.0, the sequence type of the first pilot transmitted in a symbol having symbol index 10 is C (e.g., DMRS, CSI-RS, SRS, etc.), and the power scale value ($\alpha$) thereof is 1.0. In addition, the row #4 may illustrate that the second pilot is transmitted in a symbol having symbol index 3 in units of slots, and the sequence type of the second pilot transmitted in the symbol having symbol index 3 is Z (e.g., DMRS, CSI-RS, SRS etc.) and the power scaling value ($\alpha$) thereof may is 1.0.

The same information as above may be applied to the remaining rows of [Table 1].

In addition, the base station may transmit indication information (or indicator) indicating one row of the lookup table to the transmitter or the receiver, and the transmitter and the receiver may identify, in a row indicated by the indication information, a transmission location, a transmission periodicity, usage, a sequence type, or a power scaling value of a pilot.

Alternatively, the pilot information for each usage may include a transmission location (a time and/or a frequency resource), a transmission periodicity, usage, a sequence type, or a power scaling value of each of the first pilot and the second pilot.

On the other hand, determination as to whether a first pilot is additionally needed to obtain more accurate channel information or a second pilot is additionally needed to obtain more accurate non-linearity information may be made based on at least one of reception performance of the receiver, a transmission signal type of the transmitter, or a PA specification. In case that the first pilot or the second pilot is additionally required, the base station may dynamically determine pilot information for each usage by additionally selecting the first pilot or the second pilot and provide the pilot information for each usage to the transmitter or the receiver. Hereinafter, operations of a base station and a terminal considering multi-pilot for each usage provided in the disclosure will be described with reference to FIGS. 10 to 13.

Figure 10:
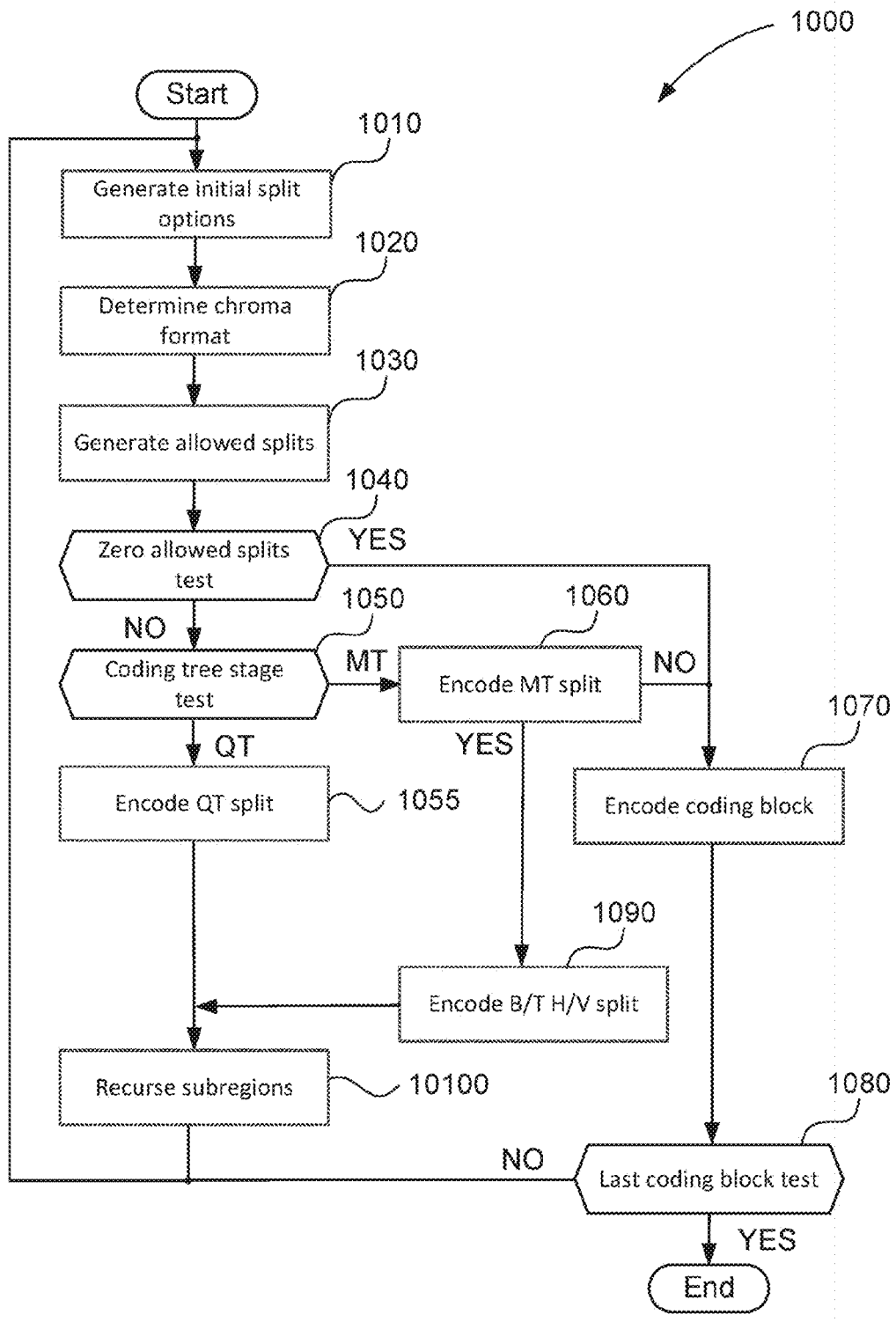
FIG. 10 illustrates an example of an overall operation of a base station according to an embodiment of the present disclosure.

FIG. 10 illustrates an example of an overall operation of a base station according to an embodiment of the present disclosure.

Referring to FIG. 10, in operation 1005, the base station may identify (or select) a first pilot or a second pilot. Here, the base station may identify a first pilot or a second pilot used when a terminal transmits an uplink signal. Alternatively, the base station may identify a first pilot or a second pilot used at the time of transmitting a downlink signal. That is, the base station may identify the first pilot or the second pilot by distinguishing between uplink and downlink.

For example, the base station may identify the first pilot as shown in following examples.

In one example, the base station may perform power scaling of a previously generated pilot by multiplying the same by a value less than 1 and select the power-scaled pilot as the first pilot.

In one example, when a transmitter (a terminal in case of uplink, or a base station in case of downlink) may transmit a specific pilot for channel information at a specific location, the base station may compare signal characteristics including a PAPR and select, as the first pilot, a pilot which experiences the smaller nonlinearity among selectable candidate pilots. Here, the base station may select, as the first pilot, at least one pilot having a PAPR equal to or less than (or below) a specific value from among selectable candidate pilots. Meanwhile, the selectable candidate pilots may include one or more pilots selected based on at least one of PAPR, a peak value of the input signal (PAin) or output signal (PAout) of the PA, and a size distribution characteristic of the input signal (PAin) of the PA. The base station may classify (or group) pilots according to at least one of a PAPR, a peak value of the input signal (PAin) or output signal (PAout) of the PA, and a size distribution characteristic of the input signal (PAin) of the PA, and select a pilot from among the classified selectable candidate pilots.

In one example, in case that a transmitted pilot and a location thereof are fixed, the base station may compare signal characteristics including a PAPR of the transmitted pilots, and select a pilot which experiences relatively smaller nonlinearity as the first pilot. For example, the base station may select, as the first pilot, at least one pilot having a PAPR equal to or less than (or below) a specific value from among transmitted pilots.

For example, the base station may identify the second pilot as shown in following examples.

In one example, the base station may perform power scaling of a previously generated pilot by multiplying the same by a value greater than 1 by considering a size distribution characteristic of a data part and a pilot part, and select this power-scaled pilot as the second pilot.

In one example, in case that a transmitter (a terminal in case of uplink, or a base station in case of downlink) may transmit a specific pilot to a specific location in order to obtain non-linearity information, the base station may compare signal characteristics including a PAPR and select, as the second pilot, a pilot which experiences the more sufficient nonlinearity among selectable candidate pilots. For example, the base station may select, as the second pilot, at least one pilot having a PAPR greater than or equal to (or exceeding) a specific value from among selectable candidate pilots. Meanwhile, the selectable candidate pilots may include one or more pilots selected based on at least one of a PAPR, a peak value of the input signal (PAin) or output signal (PAout) of the PA, and a size distribution characteristic of the input signal (PAin) of the PA. The base station may classify (or group) pilots according to at least one of a PAPR, a peak value of the input signal (PAin) or output signal (PAout) of the PA, and a size distribution characteristic of the input signal (PAin) of the PA, and select a pilot from among the classified selectable candidate pilots.

In one example, in case that a transmitted pilot and a location thereof are fixed, the base station may select a pilot which experiences the more sufficient nonlinearity as the second pilot by comparing signal characteristics including a PAPR of the transmitted pilots. For example, the base station may select, as the second pilot, at least one pilot having a PAPR equal to or greater than (or exceeding) a specific value from among transmitted pilots.

In operation 1010, the base station may identify (or generate) pilot information for each usage for the first pilot or second pilot identified in operation 1005.

For example, the pilot information for each usage may include a lookup table composed of rows indicating a transmission location, a transmission periodicity, a sequence type (e.g., DMRS, CSI-RS, SRS, etc.), or a power scaling value of each pilot. In addition, the pilot information for each usage may further include indication information (or an indicator) indicating one row of the lookup table.

Alternatively, the pilot information for each usage may include a transmission location, a transmission periodicity, usage, a sequence type, a power scaling value, etc. of each of the first pilot and the second pilot.

In operation 1015, the base station may transmit pilot information for each usage to the transmitter or the receiver. In this case, the base station may transmit control information including pilot information for each usage to the transmitter or the receiver. Here, the control information may imply a control message, control signaling, MAC-CE, DCI, or an RRC message. However, the use of these terms does not limit the technical scope of the disclosure.

In addition, when the base station transmits a lookup table as pilot information for each usage to the transmitter or receiver, the base station may transmit indication information (or indicator) indicating one row of the lookup table to the transmitter or receiver. Here, the indication information may be transmitted through control information, and the control information may imply a control message, control signaling, MAC-CE, DCI, or an RRC message.

In operation 1020, the base station may receive an uplink signal including the first pilot and the second pilot from the terminal according to pilot information for each usage. Alternatively, the base station may transmit a downlink signal including the first pilot and the second pilot to the terminal according to pilot information for each usage.

FIG. 10 illustrates that operations 1005 to 1020 are sequentially performed, but the disclosure is not limited thereto. Some of operations 1005 to 1020 may be omitted or may be performed in parallel.

Figure 11:
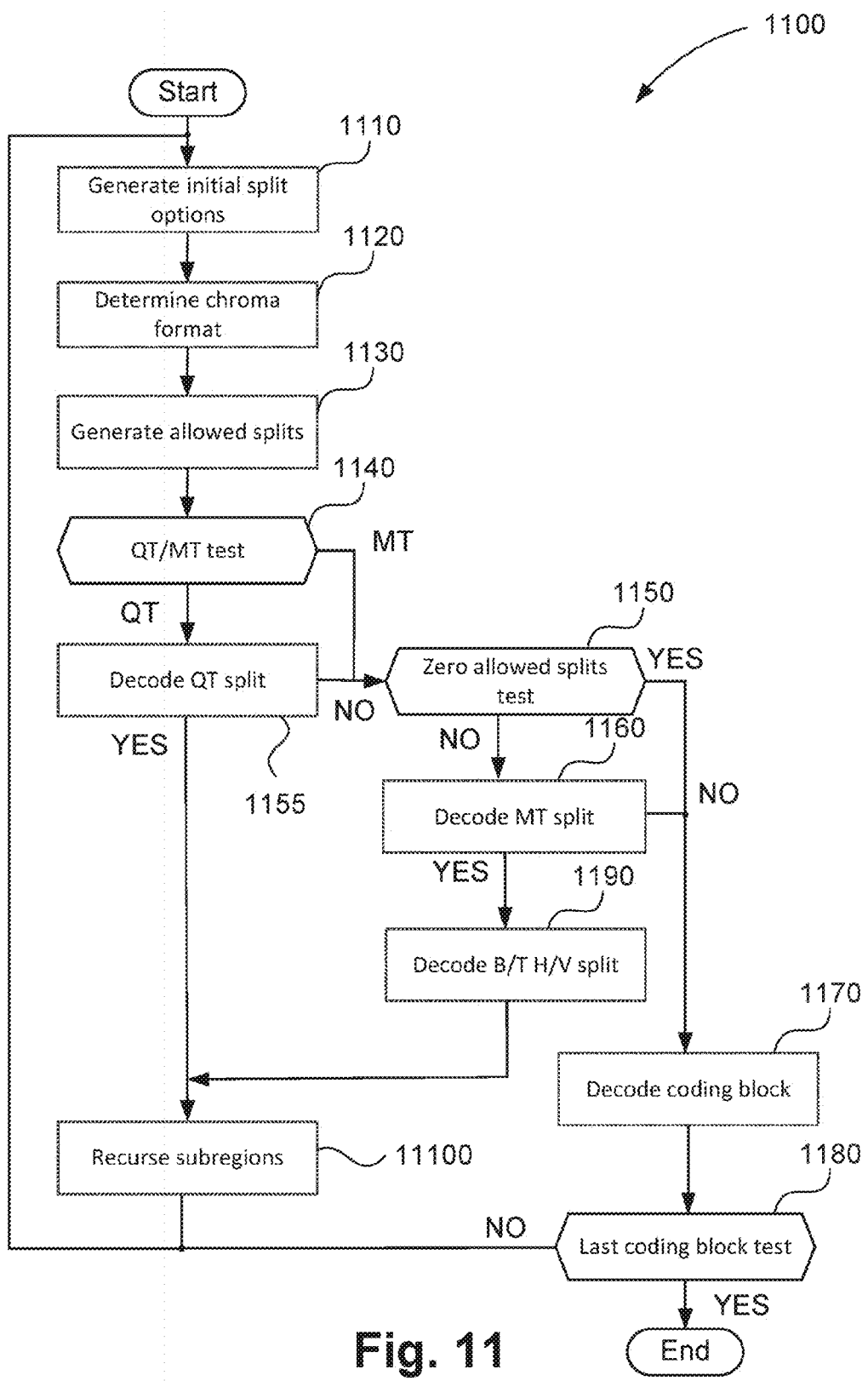
FIG. 11 illustrates an example of an overall operation of a terminal according to an embodiment of the present disclosure.

FIG. 11 illustrates an example of an overall operation of a terminal according to an embodiment of the present disclosure.

Referring to FIG. 11, in operation 1105, the terminal may receive pilot information for each usage from a base station. Here, the terminal may receive control information including pilot information for each usage from the base station. Here, the control information may imply a control message, control signaling, MAC-CE, DCI, or an RRC message. However, the use of these terms does not limit the technical scope of the disclosure.

Meanwhile, the pilot information for each usage may be information relating to a first pilot or a second pilot used when the terminal transmits an uplink signal. Alternatively, the pilot information for each usage may be information relating to a first pilot or a second pilot used when the base station transmits a downlink signal.

For example, the pilot information for each usage is may include a lookup table composed of rows indicating a transmission location (a time and/or a frequency resource), a transmission periodicity, a sequence type (e.g., DMRS, CSI-RS, SRS, etc.), or a power scaling value of each pilot. In addition, the pilot information for each usage may further include indication information (or an indicator) indicating one row of the lookup table.

Alternatively, the terminal may receive indication information (or an indicator) indicating one row of the lookup table. Here, the indication information may be transmitted through control information, and the control information may imply a control message, control signaling, MAC-CE, DCI, or an RRC message.

Alternatively, the pilot information for each usage may include a transmission location, a transmission periodicity, usage, a sequence type, or a power scaling value of each of the first pilot and the second pilot.

In operation 1110, the terminal may identify the first pilot or the second pilot based on the pilot information for each usage. For example, the terminal may identify a transmission location, a transmission periodicity, a sequence type, or a power scale value of the first pilot based on the pilot information for each usage. In addition, the terminal may identify a transmission location, a transmission periodicity, a sequence type, or a power scale value of the second pilot based on the pilot information for each usage.

In operation 1115, the terminal may transmit an uplink signal including the first pilot or the second pilot to the base station. Alternatively, the terminal may receive a downlink signal including the first pilot or the second pilot from the base station.

FIG. 11 illustrates that operations 1105 to 1115 are sequentially performed, but the disclosure is not limited thereto. Some of operations 1105 to 1115 may be omitted or performed in parallel.

Figure 12:
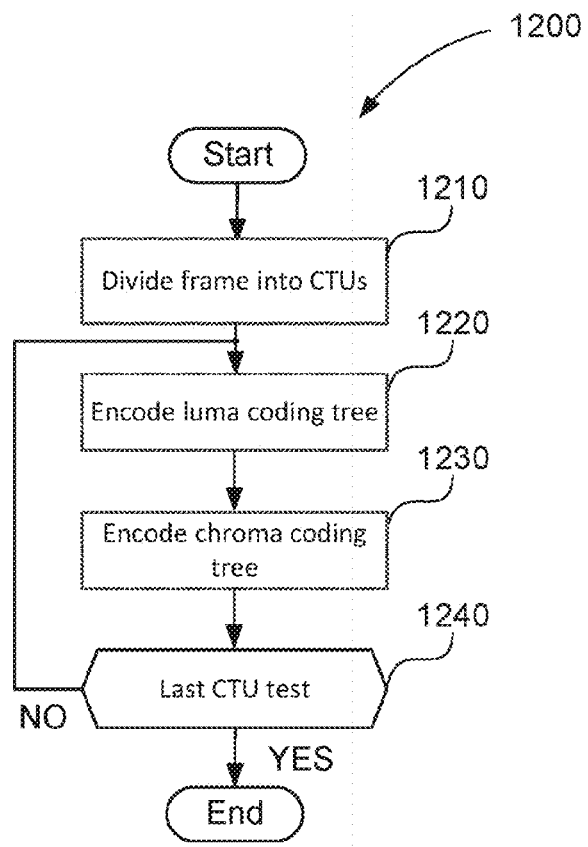
FIG. 12 illustrates an example of a multi-pilot operation for each usage when a terminal transmits an uplink signal to a base station according to an embodiment of the present disclosure.

FIG. 12 illustrates an example of a multi-pilot operation for each usage when a terminal transmits an uplink signal to a base station according to an embodiment of the present disclosure.

Referring to FIG. 12, in operation 1205, the terminal and the base station may exchange capability information of the terminal. For example, the capability information of the terminal may include information on whether an NC function is supported or information on whether multi-pilot operation is supported. Alternatively, the capability information of the terminal may include information on whether the NC function and multi-pilot operation are supported.

The base station may transmit a message enquiring about capability information of the terminal (e.g., a terminal capability enquiry message) to the terminal. In response to the enquiry message, the terminal may transmit a message (e.g., a terminal capability response message) including its capability information to the base station. Here, the terminal capability enquiry message and the terminal capability response message may correspond to RRC messages. The base station having received the capability information of the terminal may identify whether or not the terminal supports the NC function or multi-pilot operation.

Operation 1205 in which the terminal and the base station exchange capability information may be omitted. For example, when the base station has already acquired capability information of the terminal, operation 1205 may be omitted. For example, operation 1205 in which the terminal and the base station exchange capability information may be performed in an initial link setup procedure between the terminal and the base station.

If the terminal supports the NC function and multi-pilot operation, in operation 1210, the base station may identify a pilot for each usage including a first pilot for channel information acquisition or a second pilot for non-linearity information acquisition, and may determine a time and/or a frequency resource, a periodicity, and the like for transmission of a pilot for each usage.

Meanwhile, the base station may determine a time and/or a frequency resource for transmitting a pilot for each usage based on a degree of change in a channel characteristic or a PA characteristic. For example, when the degree of change in channel characteristic is greater than the degree of change in PA characteristic, X % of at least one pilot that can be selected as a first pilot or a second pilot by the base station may be allocated as the second pilot used for acquisition of non-linearity information and (100−X) % of the at least one pilot may be allocated as the first pilot used for channel estimation. Meanwhile, X may be a predefined value according to the degree to which a channel characteristic or a PA characteristic change. For example, when the degree of change of channel characteristic is greater than the degree of change of PA characteristic, X may be a value less than 50. In this case, since the first pilots, the number of which is greater than that of the second pilots, are allocated, accurate channel information may be obtained. Alternatively, when the degree of change of the channel characteristic is smaller than the degree of change of the PA characteristic, X may be a value of 50 or more. In this case, since the second pilots, the number of which is greater than that of the first pilots, are allocated, accurate non-linearity information may be obtained. For example, when X is 20, 20% of at least one pilot that can be selected as the first pilot or the second pilot may be allocated as the second pilot and thus 80% of the at least one pilot may be allocated as the first pilot.

In operation 1215, the base station may transmit pilot information for each usage. For example, pilot information for each usage may include a time and/or a frequency resource, a periodicity, usage (channel information acquisition or non-linearity information acquisition), a sequence type (DMRS, CSI-RS, SRS, etc.), a power scaling value, etc. of each pilot. Here, the base station may transmit control information including pilot information for each usage to the terminal, and the control information may imply a control message, control signaling, MAC-CE, DCI, or an RRC message. Meanwhile, the base station may semi-statically or dynamically transmit pilot information for each usage to the terminal.

As an example in which the base station semi-statically transmits pilot information for each usage to the terminal, the base station may transmit pilot information for each usage including a look-up table composed of rows indicating a transmission location (a time and/or a frequency resource), a transmission periodicity, a sequence type (e.g., DMRS, SRS, etc.), or a power scaling value of each pilot to the terminal. Here, the pilot information for each usage may further include indicator information (or indicator) indicating one row of the lookup table.

In addition, the base station may transmit information (or indicator) indicating one row of the lookup table to the terminal. Here, the indication information may be transmitted through control information, and the control information may imply a control message, control signaling, MAC-CE, DCI, or an RRC message.

As another example of semi-statically transmitting pilot information for each usage to the terminal, the base station may transmit, to the terminal, pilot information for each usage including a transmission location (a time and/or a frequency resource), a transmission periodicity, usage, a sequence type, a power scaling value, and the like of each of the first pilot and the second pilot.

As an example in which the base station dynamically transmits pilot information for each usage to the terminal, the base station may transmit pilot information for each usage to the terminal according to a request of the terminal or a determination of the base station. For example, the terminal may determine whether additional transmission of the first pilot or the second pilot is required, based on the shape of a transmission signal and the specification of a PA. When additional transmission of the first pilot or the second pilot is required, the terminal may request additional transmission of the first pilot or the second pilot from the base station. In this case, the request for additional transmission of the first pilot or the second pilot may be transmitted through control information, and the control information may imply a control message, control signaling, MAC-CE, UCI, or an RRC message. At the request of the terminal, the base station may determine pilot information for each usage by considering additional transmission of the first pilot or the second pilot and transmit the determined pilot information to the terminal.

As another example, the base station may determine whether additional transmission of the first pilot or the second pilot is required, based on uplink reception performance. If additional transmission of the first pilot or the second pilot is required, the base station may determine pilot information for each usage by considering the additional transmission of the first or second pilot, and transmit the determined pilot information to the terminal, so as to instruct additional transmission of the pilot for each usage.

In operation 1220, the terminal may identify the first pilot or the second pilot based on the pilot transmission information for each usage, and identify (or generate) an uplink signal including the first pilot or the second pilot.

In operation 1225, the terminal may transmit an uplink signal to the base station.

In operation 1230, the base station may obtain channel information from the first pilot of the received uplink signal and non-linearity information from the second pilot thereof based on the pilot transmission information for each usage.

In operation 1235, the base station may perform a data reception process including non-linearity compensation for a data part of the uplink signal, based on the channel information and the non-linearity information.

Meanwhile, if the terminal does not support multi-pilot operation, operations 1210 to 1235 of FIG. 12 may not be performed. In this case, the terminal may transmit a signal including a pilot and data to the base station as shown in FIG. 6 without considering multiple pilots. The base station may perform a data reception process without considering multiple pilots.

Although operations 1205 to 1235 are illustrated in FIG. 12 as sequentially performed, the disclosure is not limited thereto. Some of operations 1205 to 1235 may be omitted or performed in parallel.

Figure 13:
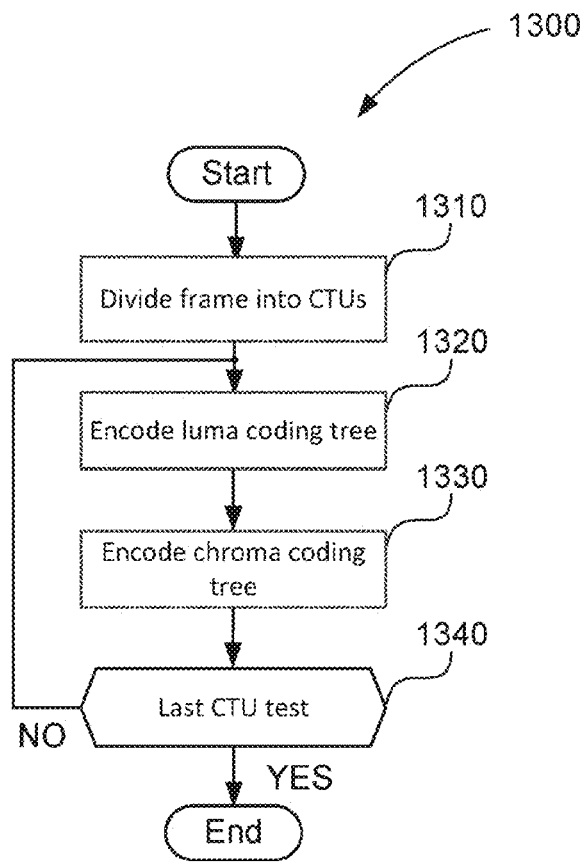
FIG. 13 illustrates an example of a multi-pilot operation for each usage when a base station transmits a downlink signal to a terminal according to an embodiment of the present disclosure.

FIG. 13 illustrates an example of a multi-pilot operation for each usage when a base station transmits a downlink signal to a terminal according to an embodiment of the present disclosure.

Referring to FIG. 13, in operation 1305, the terminal and the base station may exchange capability information of the terminal. For example, the capability information of the terminal may include information on whether an NC function is supported or information on whether multi-pilot operation is supported. Alternatively, the capability information of the terminal may include information on whether or not the NC function and multi-pilot operation are supported.

The base station may transmit a message enquiring about capability information of the terminal (e.g., a terminal capability enquiry message) to the terminal. In response to the enquiry message, the terminal may transmit a message (e.g., a terminal capability response message) including its capability information to the base station. Here, the terminal capability enquiry message and the terminal capability response message may correspond to RRC messages. The base station having received the capability information of the terminal may identify whether or not the terminal supports the NC function or multi-pilot operation.

Operation 1305 in which the terminal and the base station exchange capability information may be omitted. For example, when the base station has already acquired capability information of the terminal, operation 1305 may be omitted. For example, operation 1305 in which the terminal and the base station exchange capability information may be performed in an initial link setup procedure between the terminal and the base station.

If the terminal supports the NC function and multi-pilot operation, in operation 1310, the base station may identify a pilot for each usage including a first pilot for channel information acquisition or a second pilot for non-linearity information acquisition, and may determine a time and/or a frequency resource, a periodicity, and the like for transmission of a pilot for each usage.

Meanwhile, the base station may determine a time and/or a frequency resource for transmitting a pilot for each usage based on a degree of change in a channel characteristic or a PA characteristic. For example, when the degree of change in channel characteristic is greater than the degree of change in PA characteristic, X % of at least one pilot that can be selected as a first pilot or a second pilot by the base station may be allocated as the second pilot used for acquisition of non-linearity information and (100−X) % of the at least one pilot may be allocated as the first pilot used for channel estimation. Meanwhile, X may be a predefined value according to the degree to which a channel characteristic or a PA characteristic change. For example, when the degree of change of channel characteristic is greater than the degree of change of PA characteristic, X may be a value less than 50. In this case, since the first pilots, the number of which is greater than the second pilots, are allocated, accurate channel information may be obtained. Alternatively, when the degree of change of the channel characteristic is smaller than the degree of change of the PA characteristic, X may be a value of 50 or more. In this case, since the second pilots, the number of which is greater than the first pilots, are allocated, accurate non-linearity information may be obtained. For example, when X is 20, 20% of at least one pilot that can be selected as the first pilot or the second pilot may be allocated as the second pilot and thus 80% of the at least one pilot may be allocated as the first pilot.

In operation 1315, the base station may transmit pilot information for each usage. For example, pilot information for each usage may include a time and/or a frequency resource, a periodicity, usage (channel information acquisition or non-linearity information acquisition), a sequence type (DMRS, CSI-RS, SRS, etc.), a power scaling value, etc. of each pilot. Here, the base station may transmit control information including pilot information for each usage to the terminal, and the control information may imply a control message, control signaling, MAC-CE, DCI, or an RRC message. Meanwhile, the base station may semi-statically or dynamically transmit pilot information for each usage to the terminal.

As an example in which the base station semi-statically transmits pilot information for each usage to the terminal, the base station may transmit pilot information for each usage including a look-up table composed of rows indicating a transmission location (a time and/or a frequency resource), a transmission periodicity, a sequence type (e.g., DMRS, SRS, etc.), or a power scaling value of each pilot to the terminal. Here, the pilot information for each usage may further include indicator information (or indicator) indicating one row of the lookup table.

In addition, the base station may transmit information (or indicator) indicating one row of the lookup table to the terminal. Here, the indication information may be transmitted through control information, and the control information may imply a control message, control signaling, MAC-CE, DCI, or an RRC message.

As another example of semi-statically transmitting pilot information for each usage to the terminal, the base station may transmit, to the terminal, pilot information for each usage including a transmission location (a time and/or a frequency resource), a transmission periodicity, usage, a sequence type, a power scaling value, and the like of each of the first pilot and the second pilot.

As an example in which the base station dynamically transmits pilot information for each usage to the terminal, the base station may transmit pilot information for each usage to the terminal according to a request of the terminal or a determination of the base station. For example, the base station may determine whether additional transmission of the first pilot or the second pilot is required, based on the shape of a transmission signal and the specification of a PA. When additional transmission of the first pilot or the second pilot is required, the base station may determine pilot information for each usage by considering additional transmission of the first pilot or the second pilot and transmit the determined pilot information to the terminal, so as to instruct additional transmission of the pilot for each usage.

As another example, the terminal may determine whether additional transmission of the first pilot or the second pilot is required, based on downlink reception performance. If additional transmission of the first pilot or the second pilot is required, the terminal may request additional transmission of the first pilot or the second pilot from the base station. In this case, the request for additional transmission of the first pilot or the second pilot may be transmitted through control information, and the control information may imply a control message, control signaling, MAC-CE, UCI, or an RRC message. At the request of the terminal, the base station may determine pilot information for each usage by considering additional transmission of the first pilot or the second pilot and transmit the determined pilot information to the terminal.

In operation 1320, the base station may identify the first pilot or the second pilot according to the pilot transmission information for each usage, and identify (or generate) a downlink signal including the first pilot or the second pilot.

In operation 1325, the base station may transmit the downlink signal to the terminal.

In operation 1330, the terminal may obtain channel information from the first pilot of the received downlink signal and non-linearity information from the second pilot thereof based on the pilot transmission information for each usage.

In operation 1335, the terminal may perform a data reception process including non-linearity compensation for a data part of the downlink signal based on the channel information and the non-linearity information.

Meanwhile, if the terminal does not support multi-pilot operation, operations 1310 to 1335 of FIG. 13 may not be performed. In this case, the base station may transmit a signal including a pilot and data to the terminal as shown in FIG. 6 without considering multiple pilots. The terminal may perform a data reception process without considering multiple pilots.

Although operations 1305 to 1335 are illustrated in FIG. 13 as sequentially performed, the disclosure is not limited thereto. Some of operations 1305 to 1335 may be omitted or performed in parallel.

FIG. 14 illustrates an example of a signal reception path on a receiver side during multi-pilot operation for each usage according to an embodiment of the present disclosure.

As described above, in a situation where a first pilot for channel information acquisition and a second pilot for non-linearity information acquisition are transmitted together with data, a base station may determine pilot information for each usage including a transmission location (a time and/or a frequency resource), a transmission periodicity, usage (acquisition of channel information or acquisition of non-linearity information), a sequence type (e.g., DMRS, CSI-RS, SRS, etc.), or a power scaling value of each pilot. Thereafter, the base station may transmit pilot information for each usage to a transmitter or a receiver.

Referring to FIG. 14, a receiver (a base station in case of uplink, a terminal in case of downlink) may identify a first pilot (e.g., a pilot of symbol indices k, m, or n) or a second pilot (e.g., a pilot of symbol index l) based on pilot information for each usage. Thereafter, the receiver may perform channel estimation through the first pilot and perform channel EQ based on channel information which is a result of the channel estimation. In addition, the receiver may obtain non-linearity information through the second pilot and perform non-linearity compensation on a data part of the received signal based on the non-linearity information. Thereafter, the receiver may perform demodulation on the PA nonlinearity-compensated data.

Meanwhile, some of the blocks shown in FIG. 14 may be omitted, and one block may perform a function of another block. In addition, each element shown in FIG. 14 may be implemented using only hardware or a combination of hardware and software/firmware. As an example, at least some of the elements of FIG. 14 may be implemented in software, while other elements may be implemented in configurable hardware or a combination of software and configurable hardware.

According to the disclosure, by operating a pilot for accurate channel estimation and a pilot for acquiring accurate non-linearity information, excellent PA non-linearity compensation performance of the receiver side can be guaranteed. Accordingly, not only the coverage of the transmitter according to the use of the PA can be improved, but also the data reception performance of the receiver can be improved.

FIG. 15 illustrates an example of AI-based NC performance depending on whether multi-pilot operation is performed according to an embodiment of the present disclosure.

Referring to FIG. 15, in a situation of inaccurate channel information (imperfect CSI), when a receiver performs NC on a data part of a received signal without special consideration in relation to pilot operation (AI-NC, Conv. of FIG. 15), a channel estimation error occurs due to a pilot which experiences the nonlinearity, and inaccurate non-linearity information is obtained. Therefore, performance is greatly deteriorated compared to a case in which the receiver performs NC on the data part of the received signal in a situation of accurate channel information (perfect CSI) (AI-NC, Perfect CSI of FIG. 15).

On the other hand, according to the multi-pilot operation method provided in the disclosure, channel estimation error due to the nonlinearity can be minimized by allocating a pilot having a low PAPR as a pilot for channel estimation, and in case that information on the non-linearity which data experiences is effectively obtained by allocating a pilot having a high PAPR as a pilot for non-linearity information acquisition (AI-NC, Provided of FIG. 15), it may be identified through FIG. 15 that a signal-to-noise ratio (SNR) gain exist compared to a case in which there is no multi-pilot operation. Therefore, according to the multi-pilot operation method provided in the disclosure, since an accurate channel estimation and accurate non-linearity information can be obtained by the receiver, the effect of improving reception performance can be expected.

FIG. 16 illustrates an example of a terminal according to an embodiment of the present disclosure.

Referring to FIG. 16, a terminal 1600 may include a transceiver 1601, a controller (e.g., a processor) 1602 and a storage (e.g., memory) 1603. According to an embodiment of the disclosure, the transceiver 1601, the controller 1602, and the storage 1603 of the terminal 1600 may operate. However, elements of the terminal 1600 according to an embodiment are not limited to the above-described example. According to another embodiment, the terminal 1600 may include more or fewer elements than the aforementioned elements. In addition, in a specific case, the transceiver 1601, the controller 1602, and the storage 1603 may be implemented in the form of a single chip.

The transceiver 1601 may include a transmitter and a receiver according to another embodiment. The transceiver 1601 may transmit/receive a signal to/from a base station. The signal may include control information and data. To this end, the transceiver 1601 may include an RF transmitter configured to up-convert and amplify the frequency of a transmitted signal, and an RF receiver configured to perform low-noise amplification of a received signal and perform down-conversion of the frequency thereof. In addition, the transceiver 1601 may receive a signal through a wireless channel, output the received signal to the controller 1602, and transmit a signal output from the controller 1602 through a wireless channel.

The controller 1602 may control a series of procedures so as to enable the terminal 1600 to perform operations according to the above-described embodiment of the disclosure. To this end, the controller 1602 may include at least one processor. For example, the controller 1602 may include a communication processor (CP) configured to perform control for communication and an application processor (AP) configured to control a higher layer such as an application program.

The storage 1603 may store control information or data included in a signal obtained from the terminal 1600, and may include an area for storing data required for control of the controller 1602 and data generated during control by the controller 1602.

In addition, the terminal 1600 may include an AI device (not shown) capable of performing at least a part of AI processing. The AI device may include an AI processor, a memory, and/or a communication unit.

For example, the controller 1602 may operate as an AI processor or perform at least some functions of the AI processor. The AI processor may learn a neural network using a program stored in the memory. Here, the neural network may be designed to simulate the structure of the human brain on a computer, and include multiple weighted network nodes that simulate the neurons of the human neural network. Multiple network nodes may transmit and receive data according to each connection relationship to simulate the synaptic activity of a neuron transmitting and receiving signals through a synapse. Here, neural networks may include deep learning models developed from neural network models. In the deep-learning model, multiple network nodes are located in different layers and may transmit and receive data according to a convolution connection relationship.

Meanwhile, the AI processor may include a data learning unit configured to learn the neural network for data classification/recognition. The data learning unit may classify data to be used for learning and acquire data to be learned. The data learning unit may learn the deep learning model by applying the acquired learning data to the deep learning model. For example, a deep learning model may be trained through supervised learning or unsupervised learning. In addition, the data learning unit may learn the deep learning model through reinforcement learning using feedback about whether the result of the situation determination according to learning is correct. The deep learning model may be trained based on the data of the input layer and the output layer.

The data learning unit may be manufactured in the form of at least one hardware chip and may be mounted on an AI device. For example, the data learning unit may be manufactured in the form of a dedicated hardware chip for artificial intelligence (AI), or manufactured as a part of a general processor (CPU) or a graphics-only processor (GPU) and be mounted on an AI device. Further, the data learning unit may be embodied by a software module. If embodied by a software module (or a program module containing instructions), the software module may be stored in a non-transitory computer-readable recording media. In this case, at least one software module may be provided by an operating system (OS) or by an application.

For example, the storage 1603 may include a memory of the AI device. The memory may store various programs and data necessary for the operation of the AI device. The memory is accessed by the AI processor, and data may be read/written/modified/deleted/updated by the AI processor. For example, the data learning unit may store a trained model associated with input/output relationship information of a PA in the memory.

For example, the communication unit of the AI device may be included in the transceiver 1601.

FIG. 17 illustrates an example of a base station according to an embodiment of the present disclosure.

Referring to FIG. 17, a base station 1700 may include a transceiver 1701, a controller (e.g., a processor) 1702, and a storage (e.g., memory) 1703. According to an embodiment of the disclosure, the transceiver 1701, the controller 1702, and the storage 1703 of the base station 1700 may operate. However, elements of the base station 1700 according to an embodiment are not limited to the above-described example. According to another embodiment, the base station 1700 may include more or fewer elements than the aforementioned elements. In addition, in a specific case, the transceiver 1701, the controller 1702, and the storage 1703 may be implemented in the form of a single chip.

The transceiver 1701 may include a transmitter and a receiver according to another embodiment. The transceiver 1701 may transmit/receive a signal to/from a terminal. The signal may include control information and data. To this end, the transceiver 1701 may include an RF transmitter configured to up-convert and amplify the frequency of a transmitted signal, and an RF receiver configured to perform low-noise amplification of a received signal and perform down-conversion of the frequency thereof. In addition, the transceiver 1701 may receive a signal through a wireless channel, output the received signal to the controller 1702, and transmit a signal output from the controller 1702 through a wireless channel.

The controller 1702 may control a series of procedures so as to enable the base station 1700 to perform operations according to the above-described embodiment of the disclosure. To this end, the controller 1702 may include at least one processor. For example, the controller 1702 may include a CP configured to perform control for communication and an AP configured to control a higher layer such as an application program.

The storage 1703 may store control information and data determined by the base station 1700 or control information and data received from the terminal, and may include an area for storing data required for control of the controller 1702 and data generated during control by the controller 1702.

In addition, the base station 1700 may include an AI device (not shown) capable of performing at least a part of AI processing. The AI device may include an AI processor, a memory, and/or a communication unit.

For example, the controller 1702 may operate as an AI processor or perform at least some functions of the AI processor. The AI processor may learn a neural network using a program stored in the memory. Here, the neural network may be designed to simulate the structure of the human brain on a computer, and include multiple weighted network nodes that simulate the neurons of the human neural network. Multiple network nodes may transmit and receive data according to each connection relationship to simulate the synaptic activity of a neuron transmitting and receiving signals through a synapse. Here, neural networks may include deep learning models developed from neural network models. In the deep-learning model, multiple network nodes are located in different layers and may transmit and receive data according to the convolution connection relationship.

Meanwhile, the AI processor may include a data learning unit configured to learn the neural network for data classification/recognition. The data learning unit may classify data to be used for learning and acquire data to be learned. The data learning unit may learn the deep learning model by applying the acquired learning data to the deep learning model. For example, a deep learning model may be trained through supervised learning or unsupervised learning. In addition, the data learning unit may learn the deep learning model through reinforcement learning using feedback about whether the result of the situation determination according to learning is correct. For example, the data learning unit may classify the received pilot part as data of an input layer and classify a previously known pilot as data of an output layer by reflecting an amplitude scaling factor to the same. The deep learning model may be trained based on the data of the input layer and the output layer. In addition, based on the trained model, inference can be made using the data part of the received signal as an input layer.

The data learning unit may be manufactured in the form of at least one hardware chip and may be mounted on an AI device. For example, the data learning unit may be manufactured in the form of a dedicated hardware chip for artificial intelligence (AI), or manufactured as a part of a general processor (CPU) or a graphics-only processor (GPU) and be mounted on an AI device. Further, the data learning unit may be embodied by a software module. If embodied by a software module (or a program module containing instructions), the software module may be stored in a non-transitory computer-readable recording media. In this case, at least one software module may be provided by an OS or by an application.

For example, the storage 1703 may include a memory of the AI device. The memory may store various programs and data necessary for the operation of the AI device. The memory is accessed by the AI processor, and data may be read/written/modified/deleted/updated by the AI processor.

For example, the data learning unit may store a trained model associated with input/output relationship information of a PA in the memory.

For example, the communication unit of the AI device may be included in the transceiver 1701.

In methods provided in the disclosure, some or all of the contents of each embodiment may be implemented in combination without departing from the essential spirit and scope of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented.

Furthermore, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants based on the technical idea of the disclosure may be implemented.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:
    identifying a first pilot signal for a channel estimation and a second pilot signal for non-linearity compensation of a power amplifier (PA);
    identifying pilot information associated with the first pilot signal and the second pilot signal;
    transmitting, to a terminal, control information including the pilot information; and
    receiving, from the terminal, an uplink signal including the first pilot signal and the second pilot signal,
    wherein channel information is obtained based on the first pilot signal,
    wherein non-linearity information associated with the PA is obtained based on the second pilot signal, and
    wherein the non-linearity compensation for uplink data is performed based on the channel information and the non-linearity information.

2. The method of claim 1, wherein:
    the first pilot signal is one of:
        a pilot power-scaled signal by a first value less than 1,
        a pilot signal selected, based on a signal characteristic, from one or more first pilot signal candidates, or
        a pilot signal selected, based on a signal characteristic, from one or more predetermined pilot signals;
    the second pilot signal is one of:
        a pilot power-scaled signal by a second value greater than 1,
        a pilot signal selected, based on a signal characteristic, from one or more second pilot signal candidates, or
        a pilot signal selected, based on a signal characteristic, from one or more predetermined pilot signals,
    the pilot information includes:
        a table with one or more rows, or
        first information on the first pilot signal or second information on the second pilot signal;
    each of the one or more rows in the table indicates at least one of a time domain resource, a frequency domain resource, a periodicity, usage, or a sequence type of a pilot signal;
    the first information on the first pilot signal includes at least one of a time domain resource, a frequency domain resource, a periodicity, usage, or a sequence type of the first pilot signal; and
    the second information on the second pilot signal includes at least one of a time domain resource, a frequency domain resource, a periodicity, usage, or a sequence type of the second pilot signal.

3. The method of claim 1,
    wherein, in case that a request message related to a pilot signal transmission is received from the terminal or that the base station determines to indicate a transmission of the first pilot signal and the second pilot signal, the first pilot signal and the second pilot signal are identified.

4. The method of claim 1,
    wherein the pilot information is determined by considering an additional transmission of the second pilot, and
    wherein the additional transmission of the second pilot is determined based on an uplink reception performance.

5. The method of claim 1, further comprising:
    transmitting, to the terminal, a first message for inquiring capability information of the terminal; and
    in response to transmitting the first message, receiving, from the terminal, a second message including the capability information,
    wherein the capability information includes information on whether the non-linearity compensation is supported or information on whether multi-pilot operation is supported.

6. A method performed by a terminal in a wireless communication system, the method comprising:
    receiving, from a base station, control information including pilot information;
    identifying, based on the pilot information, a first pilot signal for channel estimation and a second pilot signal for non-linearity compensation of a power amplifier (PA); and
    one of
        transmitting, to the base station, an uplink signal including the first pilot signal and the second pilot signal, or uplink data based on the pilot information; or
        receiving, from the base station, a downlink signal including the first pilot signal, the second pilot signal, or downlink data based on the pilot information,
    wherein channel information is obtained based on the first pilot signal,
    wherein non-linearity information associated with the PA is obtained based on the second pilot signal, and
    wherein the non-linearity compensation for the uplink data is performed based on the channel information and the non-linearity information.

7. The method of claim 6, wherein:
    the first pilot signal is one of:
        a pilot power-scaled signal by a first value less than 1,
        a pilot signal selected, based on a signal characteristic, from one or more first pilot signal candidates, or a pilot signal selected, based on a signal characteristic, from one or more predetermined pilot signals;
the second pilot signal is one of:
a pilot power-scaled signal by a second value greater than 1,
a pilot signal selected, based on a signal characteristic, from one or more second pilot signal candidates, or
a pilot signal selected, based on a signal characteristic from one or more predetermined pilot signals,
the pilot information includes:
a table with one or more rows, or
first information on the first pilot signal or second information on the second pilot signal;
each of the one or more rows in the table indicates at least one of a time domain resource, a frequency domain resource, a periodicity, usage, or a sequence type of a pilot signal;
the first information on the first pilot signal includes at least one of a time domain resource, a frequency domain resource, a periodicity, usage, or a sequence type of the first pilot signal; and
the second information on the second pilot signal includes at least one of a time domain resource, a frequency domain resource, a periodicity, usage, or a sequence type of the second pilot signal.

8. The method of claim 6, wherein, in case that the terminal transmits a request message related to a pilot signal transmission to the base station or that the base station determines to indicate a transmission of the first pilot signal and the second pilot signal, the pilot information is received from the base station.

9. The method of claim 6, wherein the pilot information is determined by considering an additional transmission of the second pilot, wherein the additional transmission of the second pilot is determined based on an uplink reception performance.

10. The method of claim 6, further comprising:
receiving, from the base station, a first message for inquiring capability information of the terminal; and
in response to receiving the first message, transmitting, to the base station, a second message including the capability information,
wherein the capability information includes information on whether the non-linearity compensation is supported or information on whether multi-pilot operation is supported.

11. A base station in a wireless communication system, the base station comprising:
a transceiver; and
a controller operably connected to the transceiver and configured to:
identify a first pilot signal for a channel estimation and a second pilot signal for non-linearity compensation of a power amplifier (PA),
identify pilot information associated with the first pilot signal and the second pilot signal,
transmit, to a terminal, control information including the pilot information, and
receive, from the terminal, an uplink signal including the first pilot signal and the second pilot signal,
wherein channel information is obtained based on the first pilot signal,
wherein non-linearity information associated with the PA is obtained based on the second pilot signal, and
wherein the non-linearity compensation for uplink data is performed based on the channel information and the non-linearity information.

12. The base station of claim 11, wherein:
the first pilot signal is one of:
a pilot power-scaled signal by a first value less than 1,
a pilot signal selected, based on a signal characteristic, from one or more first pilot signal candidates, or
a pilot signal selected, based on a signal characteristic, from one or more predetermined pilot signals;
the second pilot signal is one of:
a pilot power-scaled signal by a second value greater than 1,
a pilot signal selected, based on a signal characteristic, from one or more second pilot signal candidates, or
a pilot signal selected, based on a signal characteristic, from one or more predetermined pilot signals,
the pilot information includes:
a table with one or more rows, or
first information on the first pilot signal or second information on the second pilot signal;
each of the one or more rows in the table indicates at least one of a time domain resource, a frequency domain resource, a periodicity, usage, or a sequence type of a pilot signal;
the first information on the first pilot signal incudes includes at least one of a time domain resource, a frequency domain resource, a periodicity, usage, or a sequence type of the first pilot signal; and
the second information on the second pilot signal includes at least one of a time domain resource, a frequency domain resource, a periodicity, usage, or a sequence type of the second pilot signal.

13. The base station of claim 11, wherein, in case that a request message related to a pilot signal transmission is received from the terminal or that the base station determines to indicate a transmission of the first pilot signal and the second pilot signal, the first pilot signal and the second pilot signal are identified.

14. The base station of claim 11, wherein the pilot information is determined by considering an additional transmission of the second pilot, and wherein the additional transmission of the second pilot is determined based on an uplink reception performance.

15. The base station of claim 11, wherein the controller is further configured to:
transmit, to the terminal, a first message for inquiring capability information of the terminal, and
in response to transmitting the first message, receive, from the terminal, a second message including the capability information, and
wherein the capability information includes information on whether the non-linearity compensation is supported or information on whether multi-pilot operation is supported.

16. A terminal in a wireless communication system, the terminal comprising:
a transceiver; and
a controller operably connected to the transceiver and configured to:
receive, from a base station, control information including pilot information,
identify, based on the pilot information, a first pilot signal for channel estimation and a second pilot signal for non-linearity compensation of a power amplifier (PA), and
one of
transmit, to the base station, an uplink signal including the first pilot signal and the second pilot signal, or uplink data based on the pilot information, or receive, from the base station, a downlink signal including the first pilot signal, the second pilot signal, or downlink data based on the pilot information, wherein channel information is obtained based on the first pilot signal, wherein non-linearity information associated with the PA is obtained based on the second pilot signal, and wherein the non-linearity compensation for the uplink data is performed based on the channel information and the non-linearity information.

17. The terminal of claim 16, wherein:

the first pilot signal is one of:
- a pilot power-scaled signal by a first value less than 1,
- a pilot signal selected, based on a signal characteristic, from one or more first pilot signal candidates, or
- a pilot signal selected, based on a signal characteristic, from one or more predetermined pilot signals;

the second pilot signal is one of:
- a pilot power-scaled signal by a second value greater than 1,
- a pilot signal selected, based on a signal characteristic, from one or more second pilot signal candidates, or
- a pilot signal selected, based on a signal characteristic from one or more predetermined pilot signals, the pilot information includes:
- a table with one or more rows, or
- first information on the first pilot signal or second information on the second pilot signal;

each of the one or more rows in the table indicates at least one of a time domain resource, a frequency domain resource, a periodicity, usage, or a sequence type of a pilot signal;

the first information on the first pilot signal includes at least one of a time domain resource, a frequency domain resource, a periodicity, usage, or a sequence type of the first pilot signal; and the second information on the second pilot signal includes at least one of a time domain resource, a frequency domain resource, a periodicity, usage, or a sequence type of the second pilot signal.

18. The terminal of claim 16, wherein, in case that the terminal transmits a request message related to a pilot signal transmission to the base station or that the base station determines to indicate a transmission of the first pilot signal and the second pilot signal, the pilot information is received from the base station.

19. The terminal of claim 16, wherein the pilot information is determined by considering an additional transmission of the second pilot, and wherein the additional transmission of the second pilot is determined based on an uplink reception performance.

20. The terminal of claim 16, wherein the controller is further configured to:

receive, from the base station, a first message for inquiring capability information of the terminal, and in response to receiving the first message, transmit, to the base station, a second message including the capability information, and wherein the capability information includes information on whether the non-linearity compensation is supported or information on whether multi-pilot operation for each usage is supported.

* * * * *